United States Patent
Lynn et al.

(10) Patent No.: US 11,820,380 B2
(45) Date of Patent: Nov. 21, 2023

(54) ETIQUETTE-BASED VEHICLE HAVING PAIR MODE AND SMART BEHAVIOR MODE AND CONTROL SYSTEMS THEREFOR

(71) Applicant: Piaggio Fast Forward Inc., Boston, MA (US)

(72) Inventors: Greg Lynn, Venice, CA (US); Jeffrey Schnapp, Cambridge, MA (US); Mitchell Weiss, Carlisle, MA (US)

(73) Assignee: Piaggio Fast Forward Inc., Boston, MA (US)

( * ) Notice: Subject to any disclaimer, the term of this patent is extended or adjusted under 35 U.S.C. 154(b) by 0 days.

(21) Appl. No.: 17/395,949

(22) Filed: Aug. 6, 2021

(65) Prior Publication Data

US 2022/0041163 A1 Feb. 10, 2022

Related U.S. Application Data

(60) Provisional application No. 63/061,897, filed on Aug. 6, 2020, provisional application No. 63/155,098, filed on Mar. 1, 2021.

(51) Int. Cl.
*G05D 1/00* (2006.01)
*B60W 30/182* (2020.01)
(Continued)

(52) U.S. Cl.
CPC ........ *B60W 30/182* (2013.01); *B60W 30/165* (2013.01); *B60W 60/001* (2020.02);
(Continued)

(58) Field of Classification Search
CPC .......................... G05D 1/0088; G05D 1/0214
See application file for complete search history.

(56) References Cited

U.S. PATENT DOCUMENTS

| 4,406,085 | A | 9/1983 | Rhodes |
| 7,188,694 | B1 | 3/2007 | Blair |
(Continued)

FOREIGN PATENT DOCUMENTS

| CN | 108205318 A | * | 6/2018 | .......... G05D 1/0221 |
| JP | 2019003540 A | * | 1/2019 | |
(Continued)

OTHER PUBLICATIONS

English Translation: Masuda, JP 2019003540 A, Jan. 2019, Japanese Patent Application Publication (Year: 2019).*

(Continued)

*Primary Examiner* — Nadeem Odeh
(74) *Attorney, Agent, or Firm* — Sunstein LLP

(57) ABSTRACT

Provided is a self-powered vehicle, comprising: a mechanical drive system, a set of sensors, and a controller coupled to the mechanical drive system to move the vehicle. The self-powered vehicle can operate in a plurality of modes, including a pair mode and a smart behavior mode. In pair mode the vehicle follows the trajectory of a user and in smart behavior mode the vehicle performs autonomous behavior. The self-powered vehicle operates with hysteresis dynamics, such that the movements of the vehicle are consistent with ergonomic comfort of the user and third-party pedestrian courtesy. The self-powered vehicle can operate with other self-powered vehicles in a convoy.

14 Claims, 20 Drawing Sheets

(51) Int. Cl.
  B60W 30/165 (2020.01)
  B60W 60/00 (2020.01)
  G05D 1/02 (2020.01)

(52) U.S. Cl.
  CPC ......... *G05D 1/0016* (2013.01); *G05D 1/0088* (2013.01); *G05D 1/021* (2013.01); *G05D 1/0212* (2013.01); *G05D 1/0214* (2013.01); *G05D 1/0223* (2013.01); *G05D 1/0287* (2013.01); *G05D 1/0011* (2013.01); *G05D 1/0221* (2013.01); *G05D 1/0225* (2013.01); *G05D 2201/02* (2013.01)

(56) References Cited

U.S. PATENT DOCUMENTS

| | | | |
|---|---|---|---|
| 9,572,467 | B2 | 2/2017 | Dyson et al. |
| 9,677,294 | B2 | 6/2017 | Renaud et al. |
| 10,227,081 | B2 | 3/2019 | Ferrell et al. |
| 10,310,506 | B1* | 6/2019 | Qi ................ A45C 15/00 |
| 2006/0106496 | A1* | 5/2006 | Okamoto ........... G05D 1/0278 700/255 |
| 2013/0087393 | A1 | 4/2013 | Vanderstegen-Drake et al. |
| 2013/0305483 | A1 | 11/2013 | Dyson et al. |
| 2014/0259464 | A1 | 9/2014 | Renaud et al. |
| 2017/0368691 | A1* | 12/2017 | Li ................ G05D 1/0221 |
| 2018/0194267 | A1 | 7/2018 | Helou, Jr. |
| 2018/0327013 | A1 | 11/2018 | Ferrell et al. |
| 2019/0171225 | A1 | 6/2019 | Switkes et al. |
| 2019/0216012 | A1 | 7/2019 | Hahn |
| 2020/0174497 | A1* | 6/2020 | Cheon ............. G05D 1/0246 |
| 2021/0208589 | A1* | 7/2021 | Qi ................ A45C 13/28 |
| 2021/0304018 | A1* | 9/2021 | Usman ............. G06F 11/3409 |

FOREIGN PATENT DOCUMENTS

| | | |
|---|---|---|
| WO | 2019213264 A1 | 11/2019 |
| WO | 2020132233 A1 | 6/2020 |

OTHER PUBLICATIONS

Ahn et al., "Formation-Based Tracking Method for Human Following Robot", Jun. 2018, 2018 15th International Conference on Ubiquitous Robots (UR), (Year: 2018).*
Sales et al., "CompaRob: The Shopping Cart Assistance Robot", Feb. 2016, Hindawi International Journal of Distributed Sensor Networks, vol. 2016 (Year: 2016).*
Naudus, "The Gita Is Your Rolling Robot Porter", Feb. 4, 2017, Engadget.com online article <https://www.engadget.com/2017-02-04-gita-personal-cargo-robot-hands-on.html> (Year: 2017).*
Coxworth, ""The Vespa of Robots" Follows You", Jan. 30, 2017, NewAtlas.com online article <https://newatlas.com/piaggio-gita/47646/?itm_source=newatlas&itm_medium=article-body> (Year: 2017).*
Brown, "Gita is a New Cargo Robot That Can Follow You, Carry Your Stuff For About 4 Hours", Oct. 18, 2019, USAToday.com online article <https://www.usatoday.com/story/tech/2019/10/18/gita-personal-robot-valet/3998545002/> (Year: 2019).*
Peters, "This Rolling Robot Will Carry Your Stuff So It's Not A Hassle to Walk Anywhere", Feb. 15, 2017, FastCompany.com online article <https://www.fastcompany.com/3068107/this-rolling-robot-will-carry-your-stuff-so-its-not-a-hassle-to-walk-anywhere>( Year: 2017).*
U.S. Department of Transportation, Federal Highway Administration University Course on Bicycle and Pedestrian Transportation—Lesson 8: Pedestrian Characteristics, Jul. 2006, U.S. Department of Transportation (Year: 2006).*
English Translation: Chen, CN 108205318 A, Jun. 26, 2018, Chinese Patent Office Publication (Year: 2018).*
ISA/US; International Search Report and Written Opinion for PCT/US2021/044967; dated Nov. 17, 2021; 24 pages.

* cited by examiner dead zone
- 850 mm in the +x direction
- 60° angle at the vertex of the drop
- 842 mm from the vertex to where the straight edge intersects the circular edge
- a radius of 280 mm for the circular portion of the drop.

track zone
- parabola with a vertex of (1100.0)
- limits of ±600 mm in the ±y directions
- 120° angle that opens towards the parabola
- 660 mm from the vertex to the intersection of the parabola

ETIQUETTE-BASED VEHICLE HAVING PAIR MODE AND SMART BEHAVIOR MODE AND CONTROL SYSTEMS THEREFOR

RELATED APPLICATIONS

The present application claims the benefit of U.S. provisional application Ser. No. 63/061,897, filed Aug. 6, 2020, and U.S. provisional application Ser. No. 63/155,098, filed Mar. 1, 2021. Each of these applications is hereby incorporated herein by reference in its entirety.

TECHNICAL FIELD

The present invention relates to vehicles and control thereof, and more particularly to personal vehicles configured to operate in any of a plurality of modes, such modes including a pair mode and a smart behavior mode, and control systems therefor.

SUMMARY OF THE EMBODIMENTS

In accordance with one embodiment of the invention, there is provided a self-powered personal vehicle. The vehicle of this embodiment includes a mechanical drive system to cause movement of the vehicle; a set of sensors; and a controller, coupled to the mechanical drive system, to manage movement of the vehicle. The controller is configured to cause the vehicle to operate (i) in a pair mode with a user wherein the vehicle follows, with hysteresis dynamics, a trajectory of such user, so as to exhibit latencies in following movements of the user in a manner consistent with ergonomic comfort of the user and third-party pedestrian courtesy and (ii) in a smart behavior mode, in which the vehicle has exited from the pair mode and executes an autonomous behavior.

In a related embodiment, the controller is configured to cause the vehicle to operate in the pair mode so that the vehicle occupies a speed-dependent position behind the user. In a further related embodiment, the controller is configured to cause the vehicle to operate in the pair mode so that, in the absence of an obstacle in the way of the vehicle, the speed-dependent position is also on a default side of the user. Optionally, the controller is configured to cause the vehicle to operate in the pair mode so that, in the presence of an obstacle in the way of the vehicle, the vehicle performs a tuck in the direction of a position immediately behind the user. As a further option, the tuck performed by the vehicle follows a curve. And as a still further option, the curve is a cubic spline curve based on parameters including distance and angle between the vehicle and the user, velocity of the user, velocity of the obstacle, and distance from the vehicle to the obstacle.

In another related embodiment, the controller is configured to cause the vehicle to operate in the pair mode so that, if the user occupies a position in a dead zone area defined relative to the vehicle, the person is deemed stationary for purposes of following movements of the user. Optionally, the dead zone is teardrop shaped. In a further related embodiment, the controller is configured to cause the vehicle to operate in the pair mode so that, if the user is outside of the dead zone but occupies a position in a track zone area that surrounds the dead zone, orientation of the vehicle is adjusted so that the user is centered within the dead zone. As a further option, the controller is configured to cause the vehicle to operate in the pair mode so that, if the user leaves the track zone with a velocity in excess of a threshold, the vehicle begins following the user. Optionally, the threshold is predetermined and is about 0.6 m/s.

In another related embodiment, the controller is configured to cause the vehicle to operate in a smart behavior mode by which the vehicle engages in autonomous behavior in passing through a doorway. As a further option, the controller is configured to cause the vehicle to perform a door-passing sequence of discrete actions including a following approach moment wherein the vehicle in pair mode follows a user up until the moment when the user reaches a vicinity of the doorway; a decoupling moment wherein the vehicle decouples from pair mode with the user and initiates the autonomous behavior if a perceived door openness angle reaches a threshold angle; a smarts moment wherein the vehicle engages in the autonomous door passing behavior and navigates through the doorway to a recoupling position; a recoupling moment wherein the vehicle re-enters pair mode with the user; and a following walk-away moment wherein the vehicle transitions from a waiting position at the recoupling moment to following position in pair mode.

In another embodiment, the invention provides A plurality of etiquette-based vehicles, each vehicle comprising:
  a mechanical drive system to cause movement of such vehicle;
  a set of sensors; and
  a controller, coupled to the mechanical drive system, to manage movement of such vehicle;
  wherein the controller is configured to cause such vehicle to exhibit convoy behavior so as to participate in a convoy of the plurality of etiquette-based vehicles having a leader, the convoy behavior including: getting in line and following in line, wherein each etiquette-based vehicle, other than any etiquette-based vehicle that is the leader and operating in a smart behavior mode, (i) enters a pair mode with a distinct object, the object selected from the group consisting of the leader and another vehicle of the plurality of etiquette-based vehicles and (ii) successively joins the convoy and follows the leader, directly or indirectly, with hysteresis dynamics, as the leader executes traversal of a trajectory.

Optionally, the convoy behavior further includes the stage of leaving line formation of the convoy, wherein the vehicle exits pair mode and enters a smart behavior mode, in which the vehicle autonomously moves out of the line formation. Alternatively or in addition, in getting in line, the vehicle closest to the leader is caused to enter pair mode with the leader and each vehicle successively farther away from the leader is caused to enter pair mode with the vehicle next closer to the leader. Also alternatively or in addition, the leader is an etiquette-based vehicle that has been trained to travel autonomously along a known path.

As a further option to the embodiment described at the beginning of this Summary, in pair mode, the vehicle is configured to perform a learned path training behavior in which the vehicle experiences and stores:
  a starting location where the vehicle is located when the training behavior shall have begun;
  the trajectory of the user along which the vehicle shall have followed the user; and
  an ending location where the training behavior shall have been ended;
  wherein, after storing such experience, in smart behavior mode, the vehicle autonomously traverses the trajectory of the user, from the starting location to the ending location. Optionally, the training behavior includes storing by the vehicle of a velocity-versus-position profile over the trajectory along which the vehicle shall have followed the user, and in smart behavior mode the vehicle autonomously traverses the trajectory using the stored velocity-versus-position profile. As a further option, the velocity-versus-position profile is stored as a set of position-dependent vectors.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
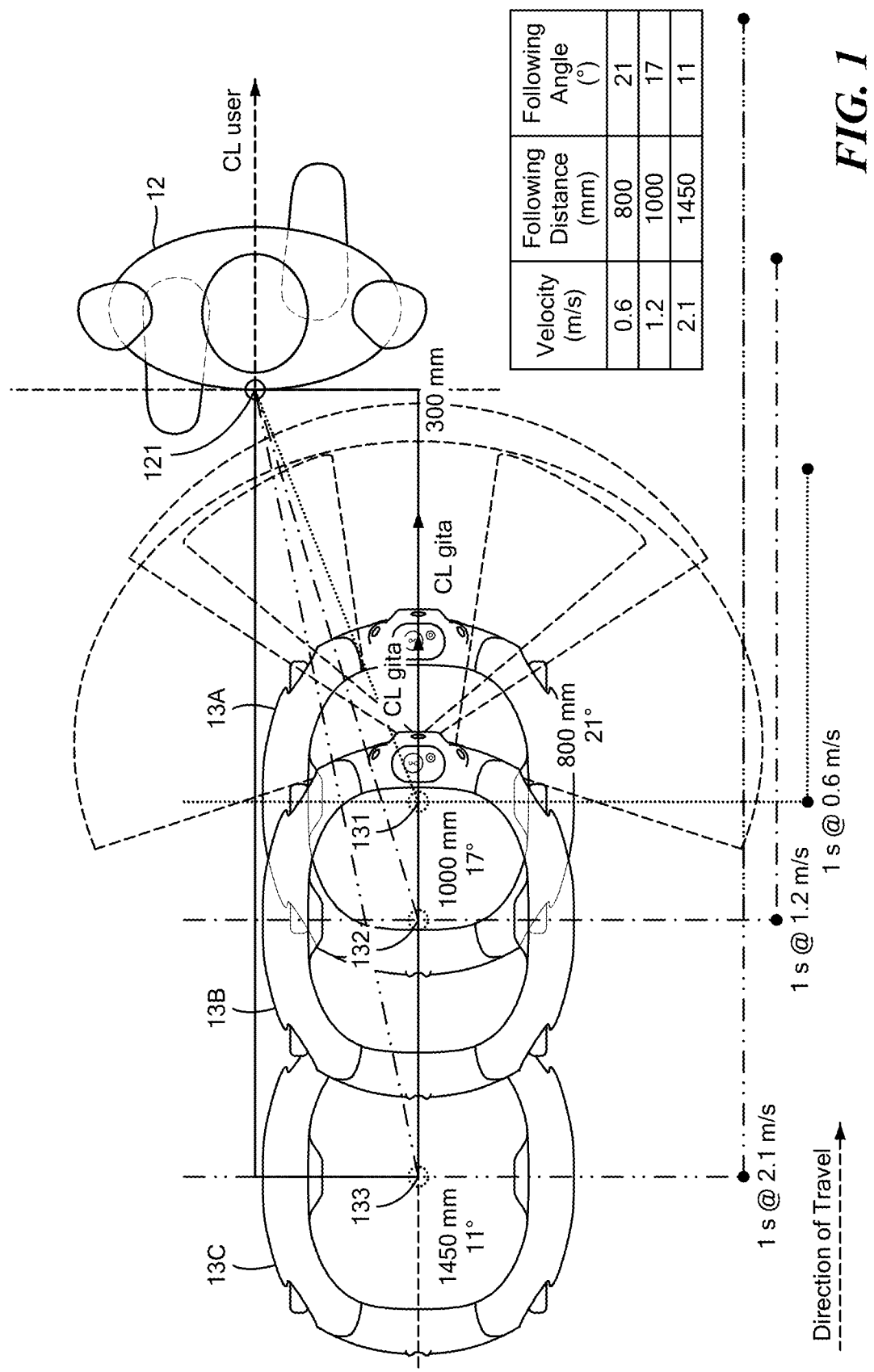
FIG. 1 is a diagram illustrating, in accordance with an embodiment of the present invention, from a top view, relative positions of a user 12 and an etiquette-based vehicle, in pair mode, in successive speed-dependent heel-following positions 13A, 13B, and 13C relative to the user.

Definitions. As used in this description and the accompanying claims, the following terms shall have the meanings indicated, unless the context otherwise requires:

A "set" includes at least one member.

A "vehicle" is device for transporting a load over land or within a structure, wherein the load is selected from the group consisting of goods, a set of people, and combinations thereof.

A "personal vehicle" is a self-powered vehicle, equipped with a set of sensors and a controller to manage its movement, and configured for operation in collaboration with a user.

A "user" is an individual selected from the group consisting of a human pedestrian and a human-controlled vehicle.

A "human-controlled vehicle" is a self-powered vehicle, having a steering system and a drive system, maneuverable over a path defined by direct or indirect manual inputs of a human driver to the steering system and the drive system. Optionally, the human driver may maneuver the vehicle by remote control. A human-controlled vehicle is considered to define a trajectory "autonomously."

A "leader" is an individual, selected from the group consisting of user and a first etiquette-based vehicle, wherein the individual autonomously defines a trajectory of a second etiquette-based vehicle that is paired with the individual.

An "etiquette-based vehicle" is a personal vehicle configured to operate in any of a plurality of modes, such modes including a pair mode and a smart behavior mode.

A "pair mode" of an etiquette-based vehicle is a mode in which the vehicle is configured to follow, with hysteresis dynamics, a trajectory of a user.

A "convoy" is a set of etiquette-based vehicles wherein each vehicle in the set, other than any etiquette-based vehicle that is a leader and operating in a smart behavior mode, is in pair mode with a distinct object selected from the group consisting of (i) a leader and (ii) another vehicle of the set. In a convoy, etiquette-based vehicles of the set are configured to move in succession behind the leader, with the first etiquette-based vehicle of the set being selected from the group consisting of the leader and an etiquette-based vehicle located immediately behind the leader, and successive etiquette-based vehicles of the set being located thereafter.

A "convoy behavior" of a single etiquette-based vehicle in a convoy of etiquette-based vehicles is that behavior required of the single etiquette-based vehicle for its participation in the convoy.

The term "hysteresis dynamics" means operation of an etiquette-based vehicle so as to exhibit latencies in following movements of the user in a manner consistent with ergonomic comfort of the user and pedestrian courtesy.

A set of etiquette-based vehicles are in a "line formation" when each successive vehicle is following, directly or indirectly, a trajectory of a leader.

A "known path" is a trajectory over which a self-powered vehicle has been trained to navigate autonomously.

A "training behavior" is a behavior of an etiquette-based vehicle in which it is configured to learn a trajectory as a known path.

A "smart behavior mode" of an etiquette-based vehicle is a mode, initiated by a trigger, in which the vehicle has exited from pair mode and executes an autonomous behavior. At a conclusion of the autonomous behavior in the smart behavior mode, the vehicle is configured to pause and to await an event in its environment that would determine its next mode, and, in default of such an event, will re-enter pair mode.

A "park mode" of an etiquette-based vehicle is a mode in which the vehicle is at rest.

A "trigger" is a set of conditions in the environment of an etiquette-based vehicle (which environment may include behavior of the user) under which the vehicle's set of sensors, in cooperation with its controller, causes the vehicle to exit from pair mode and to enter smart behavior mode. In various embodiments, occurrence of a trigger is signaled by the etiquette-based vehicle to the user, for example, by a set of optical indicators (such as lighting) on the vehicle, or by an audible indicator (which may optionally be on the vehicle), or by a dashboard display on a device that is affixed to the vehicle or separate from the vehicle (such as via a smartphone), in communication with the vehicle, executing a program for controlling a set of behaviors of the vehicle.

"Pursuit Dynamics" are criteria for performance by an etiquette-based vehicle in pair mode, with regard for the user's point of view, the bystander's perspective, and technical requirements for the vehicle itself. Such performance includes following position, start and stop dynamics, cornering and pivoting dynamics, and back-up dynamics.

A "sensor" in an etiquette-based vehicle is a device configured to provide optical, radio, or other information about a set of objects in the environment of the vehicle, wherein the information is provided as a set of electrical signals for processing by a controller to manage movement of the vehicle. In this context, a "sensor" includes a monocular camera, a stereoscopic camera, a radar imaging system, a LIDAR system, etc.

A "dead zone" is an area defined, in relation to an etiquette-based vehicle in pair mode with a user, within which the user is deemed stationary for purposes of following by the vehicle of movements of the user.

Door-passing moments are five moments wherein an etiquette-based vehicle, in accordance with embodiments of the present invention, is configured to perform a discrete action in the course of a door-passing sequence of actions. Door-passing moments collectively define a taxonomy of discrete actions that allow practical analysis and implementation of the vehicle's passage through a doorway, while each moment remains part of the larger door passage sequence. The five moments are as follows:

1. The following approach moment is the action wherein the etiquette-based vehicle in pair mode is following a user up until the moment when the user reaches a door. The vehicle follows in heel following position, adjusting between the dynamic following distances based on the user's speed and tucking for obstacle avoidance as described below. The vehicle detects that the user is stopping when the user's velocity dips below 0.6 m/s, and is configured to reach its stop position at 450 mm directly behind the user when the user's velocity is less than 0.2 m/s. In the following approach moment, in embodiments of the present invention, there is provided an additional obstacle detection requirement so that the vehicle provides to the user enough space so that the user can comfortably open a swing-in door.

2. The decoupling moment is the action wherein the vehicle decouples from pair mode with the user, and initiates the autonomous door behavior. This action, in embodiments of the present invention, commences when the perceived door openness angle, calculated from the vehicle's stopping position, as the apparent angle between the door frame and the end of the open door, reaches 60°.

3. The smarts moment is the action wherein the vehicle engages in autonomous door passing behavior, including planning the path for the vehicle's passage through the open doorway and navigating through the doorway to the recoupling position determined in the context of the specific door type.

4. The recoupling moment is the action wherein the vehicle re-enters pair mode with the user. At the recoupling moment, the vehicle is oriented in the most likely direction of the user's gaze when the user closes the door. Gaze is defined as the direction in which the front of the user's head is oriented. The vehicle thereupon initiates pair mode with the use and engages in following with hysteresis dynamics as described below.

5. The following walk-away moment is the action wherein the vehicle transitions from a waiting position at the recoupling moment to heel following position in pair mode. The vehicle resumes following when the user moves beyond the track zone with a velocity of at least 0.6 m/s. The vehicle is configured to draft behind the user and then transition to heeling, as described below.

Swing IN/Swing OUT refer to the door swinging direction of a side hinged door. The direction is determined relative to the direction of travel of the user. If the user must pull the door in order to open it, then it is a swing-IN door, whereas if the user must push the door in order to open it, then it is a swing-OUT door.

Embodiments of dynamic behavior by an etiquette-based vehicle in pair mode.

In the definitions above, we have said that, in pair mode, an etiquette-based vehicle is configured to follow, with hysteresis dynamics, a trajectory of a user. Furthermore, "hysteresis dynamics" refers to operation of an etiquette-based vehicle so as to exhibit latencies in following movements of the user in a manner consistent with ergonomic comfort of the user and pedestrian courtesy. Since the user and the vehicle are both self-powered and constitute a dynamic combination of components, the vehicle's controller is programmed to cause the vehicle to behave, i.e., to move, in accordance with these principles, in a range of distinct dynamic contexts. The vehicle's dynamic behavior in each of these contexts is programmed to conform to a set of models we have developed based on empirical measurements and related design considerations.

As to these design considerations, from the user's perspective, the pair mode establishes a sense of trust. The view of the vehicle in the user's peripheral vision, as well as the motion of tucking and untucking in response to obstacles, creates operator awareness. The heel following position draws inspiration from human-dog dyads, building upon an already familiar pairing. The vehicle in pair mode is programmed to be intuitive and to help to foster a bond between the user and the vehicle. From the bystander's perspective, the user and the vehicle are perceived as a social unit with a magic factor. Heeling draws upon social pedestrian dynamics to strengthen the pairing perception. The vehicle is visible to oncoming pedestrians, increasing awareness. When the bystander comes closer to the vehicle, it tucks out of the way, modeling good pedestrian etiquette. To minimize the width that the vehicle-user dyad takes up on a sidewalk, a narrow heel following position is preferred. A decision on whether the vehicle's following position should default to one side, to the left or to the right of the user, is made with considerations for social norms and takes into account regional differences. By following social norms, the paired vehicle is perceived as passive and polite, remaining in the slow lane and out of the way of oncoming bystander traffic. The responsibility for vehicular movement is thus placed on the user as the leader of the vehicle, and the vehicle will be cautiously following. Specifically, we address the following contexts for operation in pair mode: heel following position, obstacle avoidance, and draft following position.

Paired vehicle operation in heel following position. FIG. 1 is a diagram illustrating, in accordance with an embodiment of the present invention, from a top view, relative positions of a user 12 and an etiquette-based vehicle, in pair mode, in successive speed-dependent heel-following positions 13A, 13B, and 13C relative to the user in accordance with embodiments of the present invention. We consider vehicle operation in the context of three different user walking speeds: slow speed (0.6 m/s), normal speed (1.2 m/s), and fast speed (2.1 m/s). At a slow walking speed of 0.6 m/s in open spatial conditions, the vehicle's position 13A (determined at the center 131 of the vehicle) is 800 mm and 21° relative to a fiducial reference at the rear of a centerline through the user at point 121. At normal walking speed of 1.2 m/s in open spatial conditions, the vehicle's position, measured at the center 132 of the vehicle, is 1000 mm and 17° relative to the same fiducial reference point 121. Finally, at the fast speed of 2.1 m/s, the vehicle's position, measured at the center 133 of the vehicle, is 1450 mm and 11° relative to the fiducial reference point 121. The vehicle's following position is intended to remain within a constant lateral offset of 300 mm (from centerline of the user to centerline of the vehicle) at the three defined speeds. The angles defined above fall along the 300 mm offset line and are meant to serve as guides. Walking speeds below 0.6 m/s trigger dynamic stopping behavior. The primary side of the user on which the vehicle maintains following position should be based on regional norms, so that, for example, in the U.S. the vehicle should default to following on the right side of user, whereas in the U.K., Japan, and Australia, the vehicle should default to following on the left side of user. This behavior should be defined at point of registration during onboarding based on location and should also be a user-controlled setting in a corresponding application for controlling vehicle behavior. If repeated failure occurs and the vehicle is unable to achieve its goal of following in heeling position, it should perform following in the draft following position, discussed below.

Figure 2:
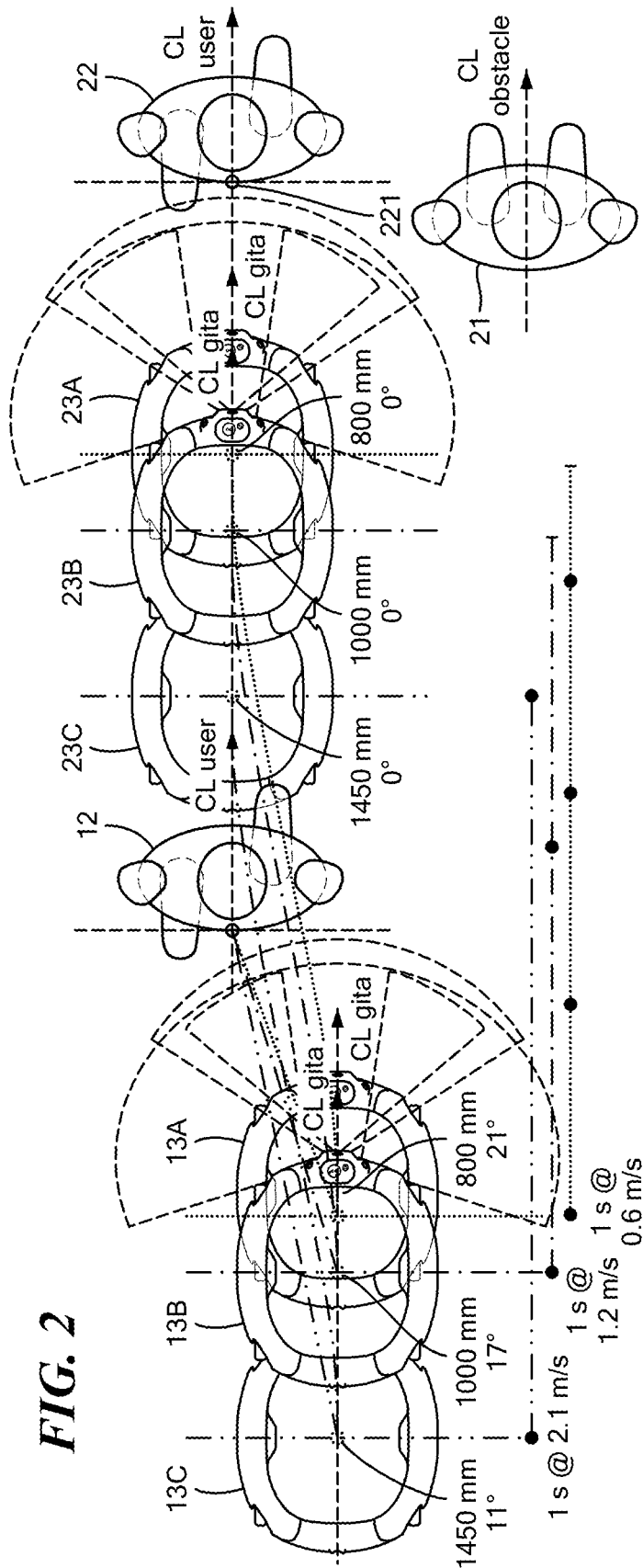
FIG. 2 is a diagram illustrating, from a top view, relative positions of a user and an etiquette-based vehicle, in accordance with an embodiment of the present invention, in pair mode, first (as in FIG. 1) in successive speed-dependent heel-following positions 13A, 13B, and 13C relative to the user 12, and second with an obstacle avoidance tuck (to avoid the pedestrian in position 21) showing the vehicle in successive speed-dependent positions 23A, 23B, and 23C relative to the user 22.

Paired vehicle operation in obstacle avoidance. FIG. 2 is a diagram illustrating, from a top view, relative positions of a user and an etiquette-based vehicle, in accordance with embodiments of the present invention, in pair mode, first (as in FIG. 1) in successive speed-dependent heel-following positions 13A, 13B, and 13C relative to the user 12, and second with an obstacle avoidance tuck (to avoid the pedestrian in position 21) showing the vehicle in successive speed-dependent positions 23A, 23B, and 23C relative to the user 22. While performing obstacle avoidance, the paired vehicle executes a tuck behavior—a transition defined by a cubic spline curve. Specifically, when the vehicle encounters an obstacle, such as pedestrian 21, it tucks behind the user 22, transitioning to a 0° angle, measured from the centerline of the user 22 at point 221 and maintaining the following distances, defined in the previous paragraph, dependent on speed. The tuck behavior during the transition period can be represented by a cubic spline curve based on the following parameters: distance and angle between the vehicle and the user; velocity of the user; velocity of the obstacle; distance from the vehicle to the obstacle. The cubic spline equation is as follows:

$$y = a(x-x_1)^3 + b(x-x_1)^2,$$

where $x_1$, a, b are constants specific to the vehicle's velocity.

Paired vehicle operation in draft following position. Once the vehicle executes the tucking behavior, in accordance with embodiments of the present invention, it maintains a draft following position, in which the vehicle follows directly behind the user. At a slow walking speed of 0.6 m/s in crowded spatial conditions, the vehicle's position is 800 mm and 0° angle. At normal walking speed of 1.2 m/s in crowded spatial conditions, the vehicle's position is 1000 mm and 0° angle. At fast walking speed of 2.1 m/s in crowded spatial conditions, the vehicle's position is 1450 mm and 0° angle. The vehicle is configured to return to heel following position under appropriate circumstances. In one embodiment, the vehicle returns to heel following position after a set amount of time, i.e. 30 seconds, of uninterrupted detections at the user's heeling side. In another embodiment, the vehicle is configured with a peeking feature under which it repetitively moves out to the side by a threshold distance sufficient to support a view ahead while remaining within the draft following threshold.

Dead zone and track zone parameters. In accordance with some embodiments of the present invention, when an etiquette-based vehicle is in pair mode with a user, the vehicle disregards nominal movements by the user. However, it is not a simple matter to determine when a movement is nominal. To that end, we conducted studies to observe how much people move while they perform simple everyday activities (such as looking for keys to open a door, picking vegetables at a market, putting away groceries in a kitchen). These activities helped us define the zones within which people move during an extended stop. Our data from such studies is summarized in FIG. 3, which is a graphic mapping from our studies of motion of individuals performing tasks in a relatively stationary position.

Figure 3:
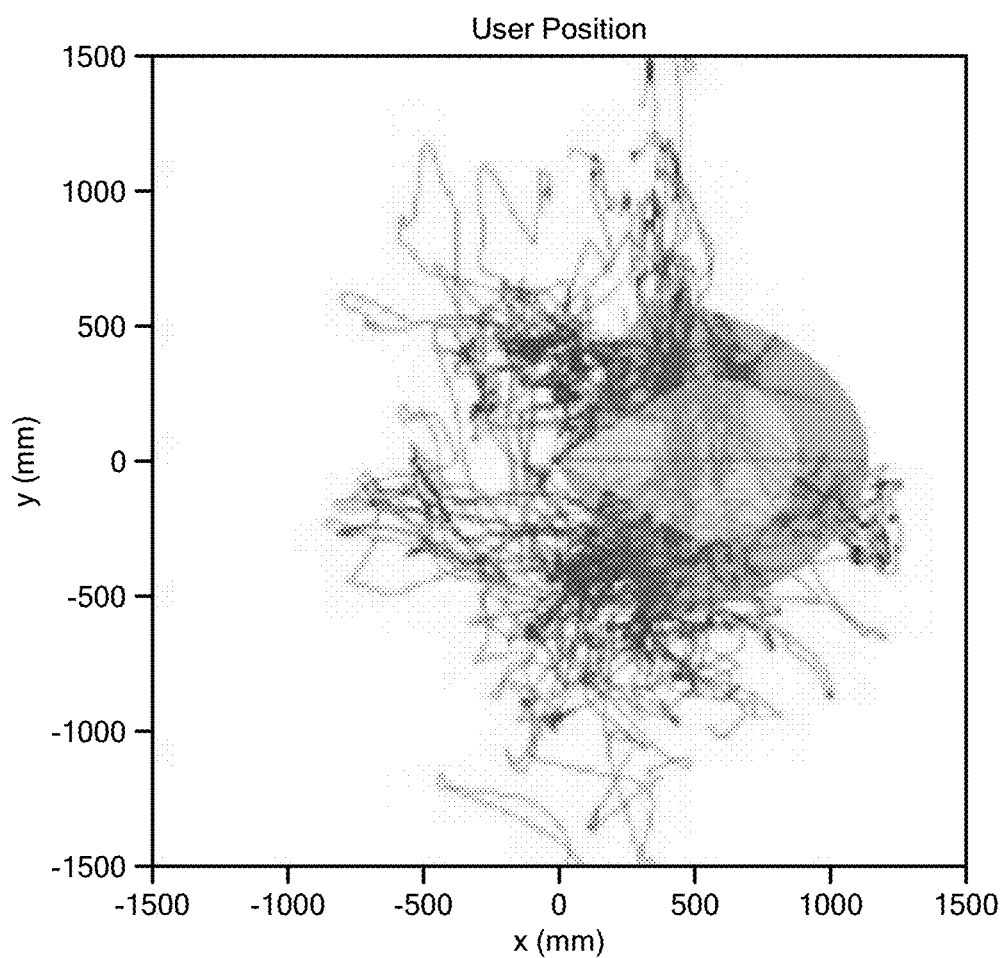
FIG. 3 is a graphic mapping from our studies of motion of individuals performing tasks in a relatively stationary position.

We further analyzed the data summarized in FIG. 3 to determine geometric distribution of data by percentiles. Table 1 shows our findings. The data in Table 1 was used to define what we call the "dead zone," from data in the $75^{th}$ percentile, and the "track zone," from data in the $90^{th}$ percentile. In addition, we found that 99% of a person's movement during stops has a velocity≤0.6 m/s, which we define, in embodiments of the present invention, as the velocity threshold of the user, above which the paired etiquette-based vehicle resumes following the user.

TABLE 1

| % of data | X-distance (± mm) | Y-distance (± mm) | Angle (± °) | Velocity (m/s) | Acceleration (m/s$^2$) |
|---|---|---|---|---|---|
| 10 | 29.8 | 17.5 | 2 | 0.014 | 0.56 |
| 20 | 53 | 36.4 | 4 | 0.022 | 0.92 |
| 25 | 66.1 | 48.6 | 5.5 | 0.027 | 1.1 |
| 30 | 81.9 | 61.8 | 7.3 | 0.032 | 1.28 |
| 40 | 130.5 | 95.5 | 10.9 | 0.044 | 1.69 |
| 50 | 177.3 | 148.2 | 15.3 | 0.061 | 2.21 |
| 60 | 237.8 | 198.4 | 20.4 | 0.084 | 2.87 |
| 70 | 300.1 | 258.3 | 26.3 | 0.116 | 3.8 |
| 75 | 363.9 | 298.7 | 30.7 | 0.141 | 4.41 |
| 80 | 425.8 | 344.3 | 34.9 | 0.174 | 5.19 |
| 90 | 528.5 | 496.6 | 56.6 | 0.284 | 7.83 |
| 99 | 833.9 | 858 | 158.8 | 0.622 | 20.2 |

From the user's perspective, latency of the paired etiquette-based vehicle's movements promotes simple decision-making as the user shifts position within the dead zone. The user is better able to navigate around vehicle, knowing that the vehicle will stay in the position it was in when the user first stopped. When the user moves beyond a defined area deemed the dead zone, the vehicle turns in place to let the user know that the vehicle is still with the user and keeps the user within its field of view. This movement reassures the user that the vehicle is still tracking the user, even though it does not react to the user's every move. When the user moves beyond the track zone, the vehicle resumes following.

The bystander's perspective is also taken into consideration. By minimizing the vehicle's movements over the timeframe of an extended stop, the vehicle's footprint is reduced and is less likely to be in the way of other people. In addition, the vehicle appears more calm, courteous, and patient. By turning in place, the vehicle lets bystanders know that it is paired with the user.

Figure 4A:
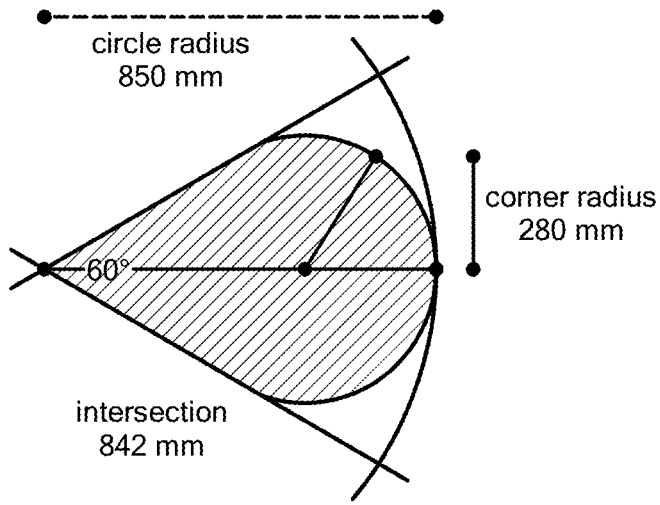
FIGS. 4A and 4B are diagrams of the dead zone and track zone respectively in accordance with embodiments of the present invention.
Figure 4B:
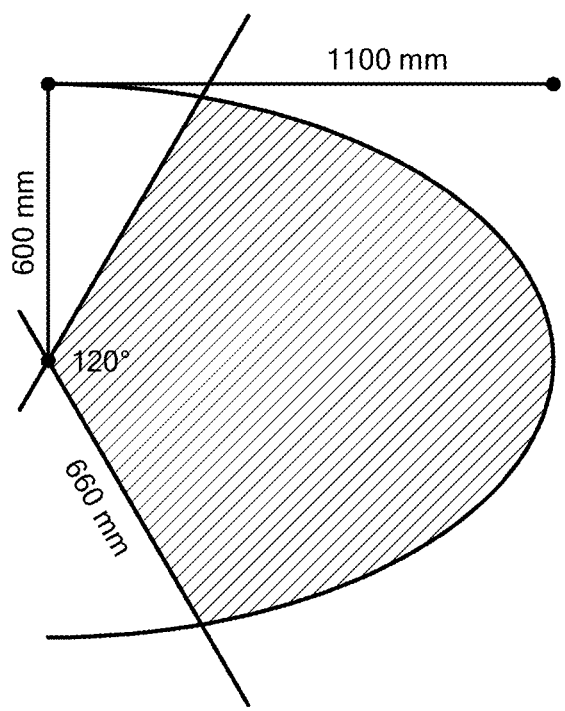

In accordance with embodiments of the present invention, the definitions of "dead zone" and "track zone" give the etiquette-based vehicle in pair mode with the user an indication of how likely the user is to remain within a defined space or to continue walking. The vehicle tracks the trajectory of the user's movements as the user is performing an activity. By measuring the angle and distance to the user at any time, the vehicle is able to determine whether the user is staying or going. FIGS. 4A and 4B are diagrams of the dead zone and track zone respectively in accordance with embodiments of the present invention. The "dead zone" is defined as a teardrop-shaped area with the following dimensions measured from vehicle's center: 850 mm in the +x direction; 60° angle at the vertex of the drop; 842 mm from the vertex to where the straight edge intersects the circular edge; and a radius of 280 mm for the circular portion of the drop. The "track zone" is defined as the area bounded by a parabolic curve and cutoff angle with the following dimensions measured from the vehicle's center: parabola with a vertex of (1100, 0); limits of +600 mm in the ±y directions; 120° angle that opens towards the parabola; 660 mm from the vertex to the intersection of the parabola.

Pairing and Start. When the user pairs with an etiquette-based vehicle, our studies show that the user tends to stand about 680 mm in front of the vehicle. The vehicle is configured to give feedback to the user through lights and sound that the pairing has been successful, and its motion remains stable. Our analysis shows that 75% of the time the user will be within the teardrop-shaped dead zone drawn from vehicle's center. In embodiments of the present invention, if the user is outside the dead zone when pairing, the vehicle is configured to rotate to orient and center itself with the user. In further embodiments of the present invention, the vehicle will begin following only once the user has left the track zone. Upon pairing, in embodiments of the present invention, when the user is in the dead zone, the vehicle remains stationary, giving the user feedback through the user interface of a successful pairing via lights and sound. If the user is outside the dead zone but within the track zone, however, the vehicle will adjust its orientation so that the user is centered within the dead zone. The vehicle is configured to remain stationary until the user leaves the track zone.

Once the user leaves the track zone with a velocity of at least about 0.6 m/s, the vehicle is configured to begin following. If the user exits the track zone with a velocity less than about 0.6 m/s, the vehicle will draft behind the user, as per design specification for stopping. As the vehicle adjusts its position and orientation to keep the user in its field of view, the dead zone and track zone shift with the vehicle.

Staying. When a person comes to a stop and performs a stationary activity for a few moments at a time, the person tends to move around within a limited area. Once in stop position, in accordance with embodiments of the present invention, the paired vehicle continues to track the user while staying in the position it was in when the user first reached a stop. In a manner similar to that configured for pairing and start, if the user moves beyond the dead zone within the track zone, the vehicle turns in place to keep the user within its field of view. Only when the user moves beyond the track zone does the vehicle resume following. In accordance with further embodiments of the present invention, the vehicle detects that the user is stopping and reaches stopping position when the user velocity is less than about 0.2 m/s. In various embodiments, the vehicle's stop position is 450 mm directly behind the user. The vehicle will not move forward from this position until the user moves beyond the track zone. When the user moves beyond the dead zone into the track zone, the vehicle rotates in place to center itself with the user. In various embodiments, the vehicle resumes following once the user moves beyond the track zone with a velocity of at least 0.6 m/s. If the user exits the track zone with a velocity less than 0.6 m/s, the vehicle will draft behind the user, as per the vehicle's design specification for stopping. In the case wherein the user halts too quickly and the vehicle fails to reach a stop position (450 mm directly behind), the vehicle remains where it is and turns to face the user. The vehicle will not move from this position until the user moves beyond the track zone as projected from the vehicle's current orientation.

Smart behavior mode and negotiation of doorways. We have defined "smart behavior mode" of an etiquette-based vehicle as embracing a behavior, initiated by a trigger, in which the vehicle has exited from pair mode and executes an autonomous behavior. At a conclusion of the autonomous behavior in the smart behavior mode, the vehicle is configured to pause and to await an event in its environment that would determine its next mode, and, in default of such an event, will re-enter pair mode. In typical embodiments of the present invention, the vehicle performs processes including temporarily unpairing from the user; autonomously driving through a doorway while the door is held open by the user the vehicle has been following; driving to a position on the other side of the doorway and waiting for the user to walk through the door; re-entering a pair relationship with, and following, the user.

The design of the autonomous behavior, in accordance with embodiments of the present invention, is informed by field observations and motion capture studies. Six hinged, swinging door types were studied: Left-swing IN, Left-swing OUT, Right-swing IN, Right-swing OUT, Double Doors-swing IN, and Double Doors-swing OUT. Direction of hinge and swing are defined in relation to the user's direction of travel. Doors that do not hang in a frame, hinge from one side, and swing open along their vertical axis to a minimum of 90 degrees are not contemplated in this specification, although, some of the design principles articulated herein may apply. Furthermore, the research study design and design specifications are constrained to approaching a door head-on, perpendicular to the door face. Nevertheless, use of a human-following robot provides an advantage to leverage the human ability to open doors and to hold them open.

Movement of a machine through a doorway with a user, while the user holds the door open, involves a more sophisticated behavioral model of the machine's motion than a model wherein the machine simply stays behind the user and matches the user's forward motion. Configuring autonomous behaviors in this context allows the vehicle to help the user to tackle challenging situations. The Smart Behaviors for Doors herein are designed to make the user experience of walking through a door with the robot feel similar to holding a door open and walking through the doorway with a person or other intelligent companion that understands etiquette associated with door opening, holding, and passing through doorways.

Our field observations and motion capture studies focused on people moving in pairs or with a rolling object through the six types of doors listed above. A reconfigurable door set was built specifically for motion capture. Twenty-four outside participants were hired with the instructions to walk through the doors together with one person opening and holding the door and another following through. The participants were not told about the reason for or use of this data, so as not to bias their behavior. They were asked variously, as leaders and followers, to walk through the six types of doors. We collected 2,240 passes of people walking through the six types of doors.

Our analysis framework was driven by the following set of questions:

Where does a person typically stop to open a door?
Where does someone or something following a person typically stop when waiting for a door to be opened?
How much does a person move when opening an inward-swinging door?
What is the openness of the door from the perspective of the follower when approaching the door?
At what moment does the follower decouple from the leader and initiate their walk through the door?
How much time passes from when the leader starts opening a door to when the follower initiates their walk through the door?
While passing through an inward-swinging door, how much space does a person leave between them and a person holding the door for them?
Where does someone or something following a person typically wait to recouple with the leader after passing through a door?
Where does a person typically stop to close a door?
Does the leader gaze indicate the recoupling moment before walking away together? For how long does the gaze overlap last?
How much time elapses between the decoupling moment at door opening to the recoupling moment at door closing?

Insights that drove the data-driven Doors Behaviors Design focused on leader and follower spatial dynamics, timing, gaze analysis, and perceived openness metrics. From the six door types which were studied, no significant differences were observed between single doors and double doors. For this reason, the resulting door specifications focus on four door types: Left-swing IN, Left-swing OUT, Right-swing IN, and Right-swing OUT. The data from double doors were divided into double doors left and double doors right, and grouped with the insights for single left and single right doors. Qualitative design considerations and technical specifications for the etiquette-based vehicle guided the methodology for how the insights were applied as final design decisions.

LEFT-SWING IN. Relative to the direction of travel of the user, a Left-swing IN door is mounted on the left side of a frame and swings inward towards the user. The total time for a pair passing through a Left-swing IN door is 7.10 seconds.

Figure 5:
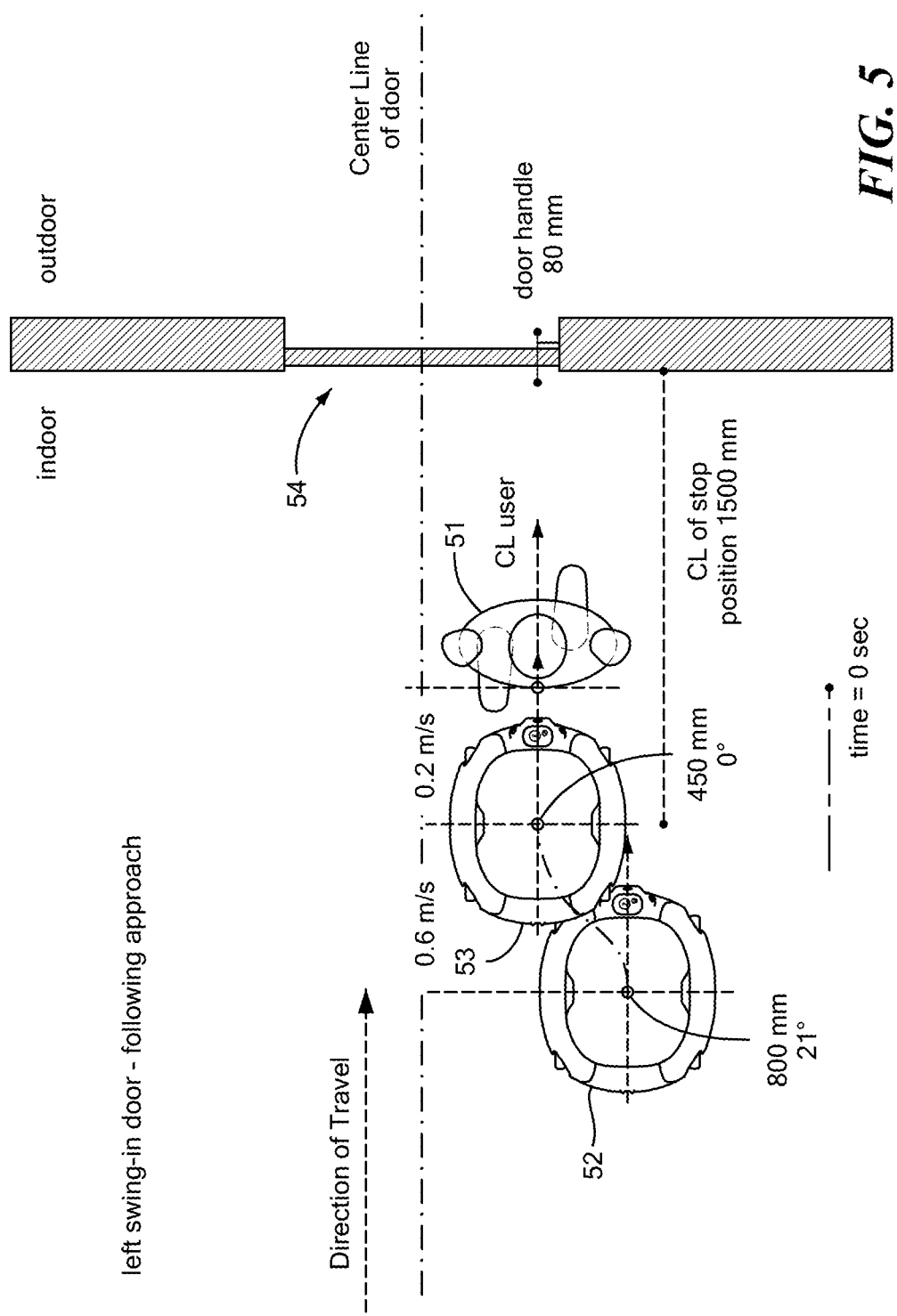
FIG. 5 is a diagram illustrating, from a top view, relative positions of a user and an etiquette-based vehicle, in pair mode, in successive positions, as the vehicle slows down in a following approach moment (as defined below) in relation to a door, in accordance with embodiments of the present invention.

Following approach moment. FIG. 5 is a diagram illustrating, from a top view, relative positions of a user 51 and an etiquette-based vehicle, in pair mode, in successive positions 52 and 53, as the vehicle slows down in a following approach moment (as defined above) in relation to door 54, in accordance with an embodiment of the present invention. Our studies show that when a person approaches a Left-swing IN door, as illustrated in FIG. 5, there is a significant variance of the leader's position towards the door handle location. The leader reaches for the handle at 400 mm from the door center line towards the door handle and 821 mm orthogonally from the door. Time is defined as (t=0) in the door passage sequence at the moment the leader reaches for the handle. The stopping position of the user reflects these observations. Our studies also show that at the moment that the leader reaches for the handle of a Left-swing IN door, the follower's position is 383 mm from the door center line and 1436 mm orthogonally from the door. The follower is closely aligned behind the leader. Our understanding of how people approach a Left-swing IN door, leads us to specify that the stopping position of an etiquette-based vehicle should be 1500 mm orthogonally from the door, aligned behind the user in accordance with the Stop Specifications.

Figure 6:
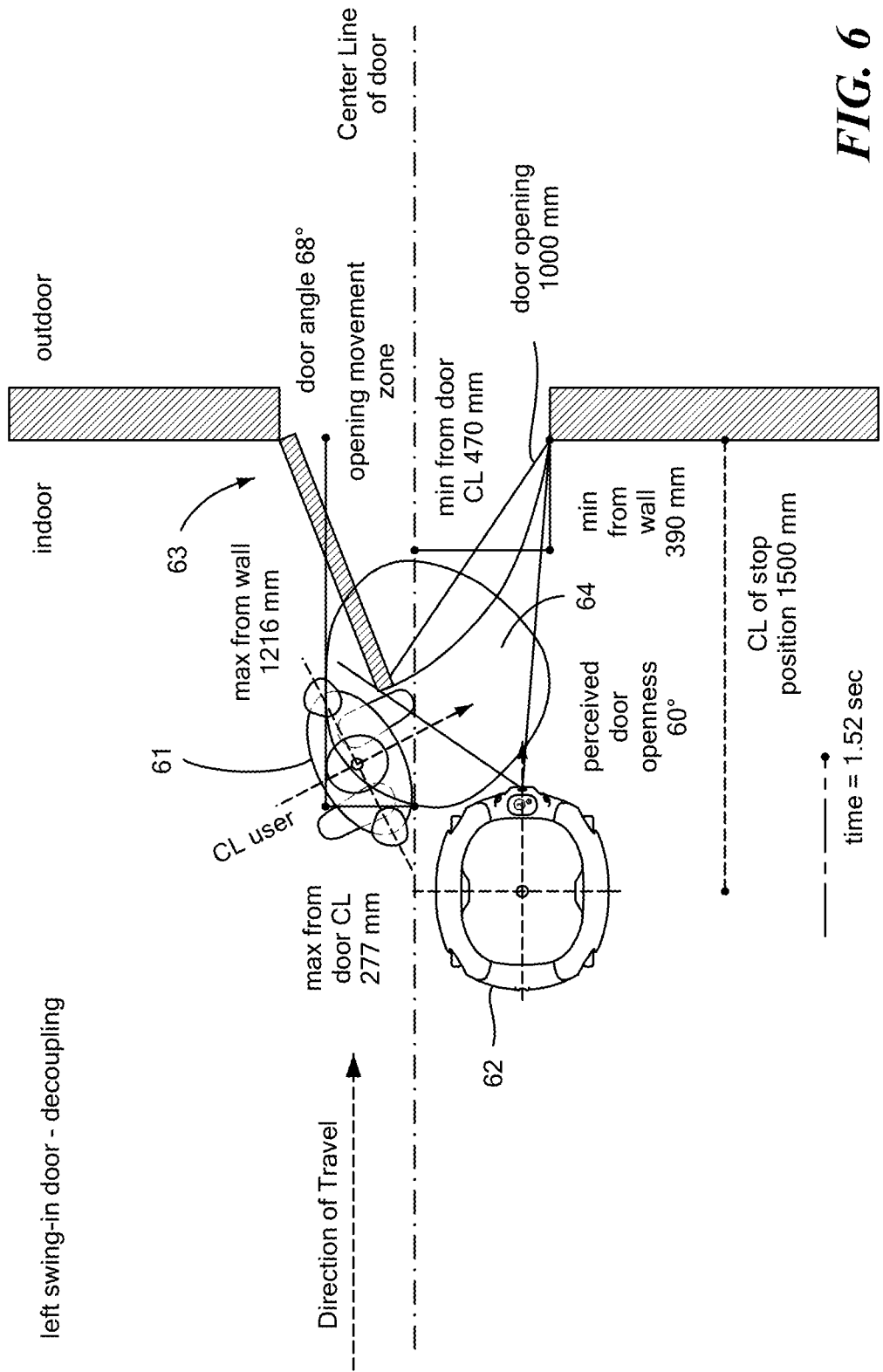
FIG. 6 is a diagram illustrating, from a top view, relative positions of a user and an etiquette-based vehicle, in pair mode, in the decoupling moment (as defined in below) in relation to a door, in accordance with embodiments of the present invention.

Decoupling moment. In order to determine when a person opens and holds a door open for a robot to move through autonomously, we observed the moment at which the follower decouples from the leader. The decoupling scenario is defined by the perceived openness angle, the angle from the follower's position measured to the door frame and the door end. In Left-swing IN doors, decoupling happens when the follower initiates walking through a door that is being held open by the leader. The perceived door openness angle at decoupling is 60°, and the actual door angle is 68°. The width of the door opening from the door frame to the door end is 1000 mm. Time when decoupling occurs is at t=1.32 seconds. To understand the space that the user occupies while moving to open and hold open a Left-swing IN door, the user's movement is visualized as the opening movement zone. The opening movement zone is graphically represented as item 64 in FIG. 6, which is a diagram illustrating, from a top view, relative positions of a user 61 and an etiquette-based vehicle 62, in pair mode, in the decoupling moment (as defined above) in relation to a door 63, in accordance with an embodiment of the present invention. The opening movement zone 64 is defined by four extent values: orthogonally from the door: min 390 mm and max 1216 mm; from door center line: min 470 mm to the right and max 277 mm to the left, in the direction of travel.

Figure 7:
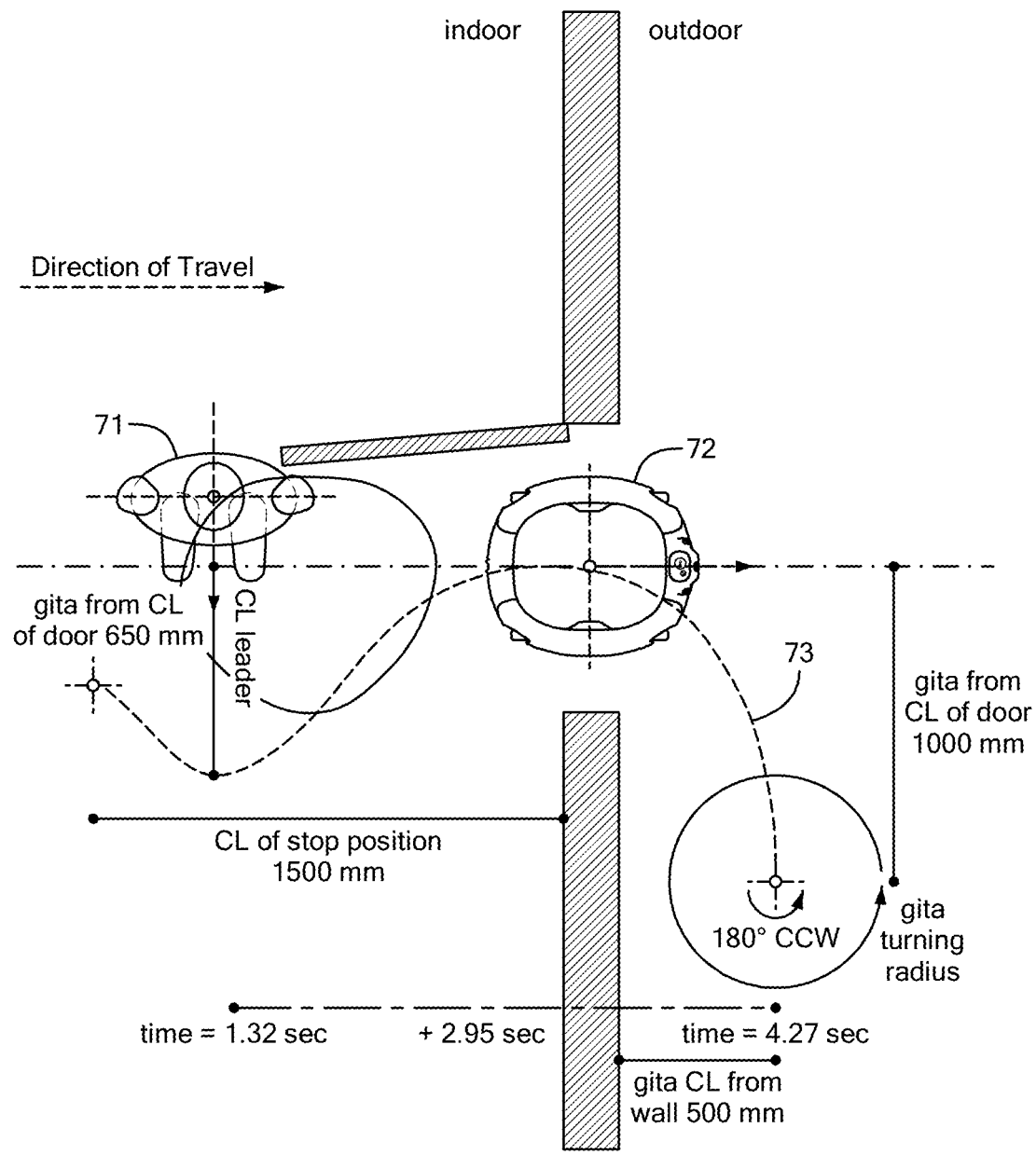
FIG. 7 is a diagram illustrating, from a top view, relative positions of a user and an etiquette-based vehicle, in the smarts moment (as defined in below) in relation to a door as the vehicle navigates autonomously through the doorway, in accordance with embodiments of the present invention.

Smarts moment. FIG. 7 is a diagram illustrating, from a top view, relative positions of a user 71 and an etiquette-based vehicle 72, in the smarts moment (as defined above) in relation to a door, as the vehicle 72 navigates autonomously over path 73 through the doorway in accordance with embodiments of the present invention.

Our research studies revealed that the follower holds a distance of 882 mm of personal space when passing the leader. Based on the recorded leader and follower positions, our recommended distance is given in relation to the door center line. Beginning at the moment of decoupling, at initiation of the smarts moment, the etiquette-based vehicle initiates the Left-swing IN autonomous path 73 through the door. In this behavior, the vehicle first makes a wide turn with a radius of 650 mm perpendicular to the door center line, to the right in the direction of travel, and then veers back to align itself with the door centerline as it passes through the threshold. As observed in the research studies, the follower's waiting position on the other side of the door was 973 mm from the door center line and 707 mm orthogonally from the door. This observation is used to configure the waiting position of the etiquette-based vehicle on the other side of the door: 1000 mm perpendicular to the door center line and 500 mm orthogonally from the door. The smarts moment starts at decoupling (t=1.32 seconds) and ends at recoupling (t=4.27 seconds), a total of 2.95 seconds for the autonomous passage through the door.

Figure 8:
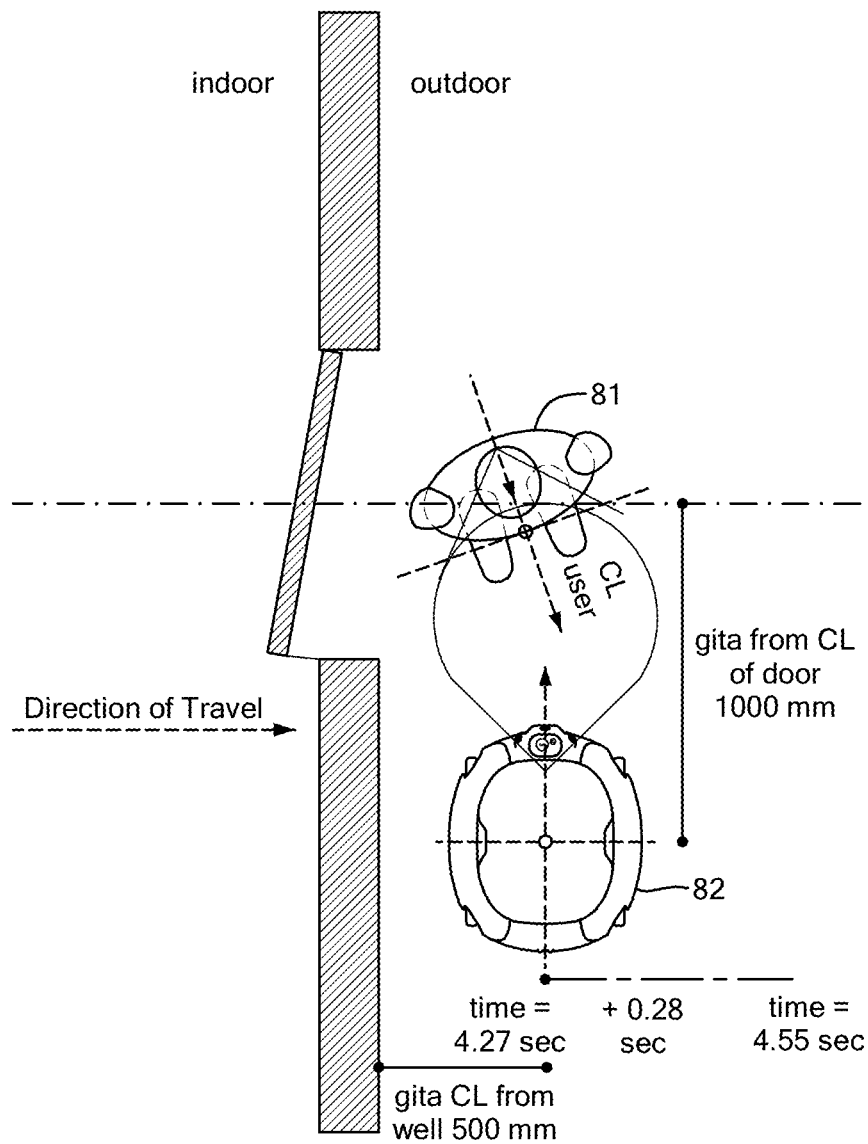
FIG. 8 is a diagram illustrating, from a top view, relative positions of a user and an etiquette-based vehicle in the recoupling moment (as defined in below) in relation to a door, in accordance with an embodiment of the present invention after the vehicle has navigated autonomously through the doorway, when the user closes the door and the vehicle is oriented in the most likely direction of the user's gaze.

Recoupling moment. FIG. 8 is a diagram illustrating, from a top view, in accordance with an embodiment of the present invention, relative positions of a user 81 and an etiquette-based vehicle 82, in the recoupling moment (as defined above) in relation to a door, after the vehicle 82 has navigated autonomously through the doorway, when the user closes the door and the vehicle is oriented in the most likely direction of the user's gaze. The recoupling moment begins when the user's gaze overlaps that of the etiquette-based vehicle in acknowledgement of rejoining and readiness to continue walking. The vehicle's position at the recoupling moment is determined by the observation that 74% of the time a person looks towards the door opening while closing a Left-swing IN door. The recoupling moment occurs at t=4.27 seconds in the door passage sequence. The length of time in which the leader looks in the follower's direction is about 0.28 seconds. The vehicle is expected to re-enter pair mode with the user within 0.28 seconds.

Figure 9:
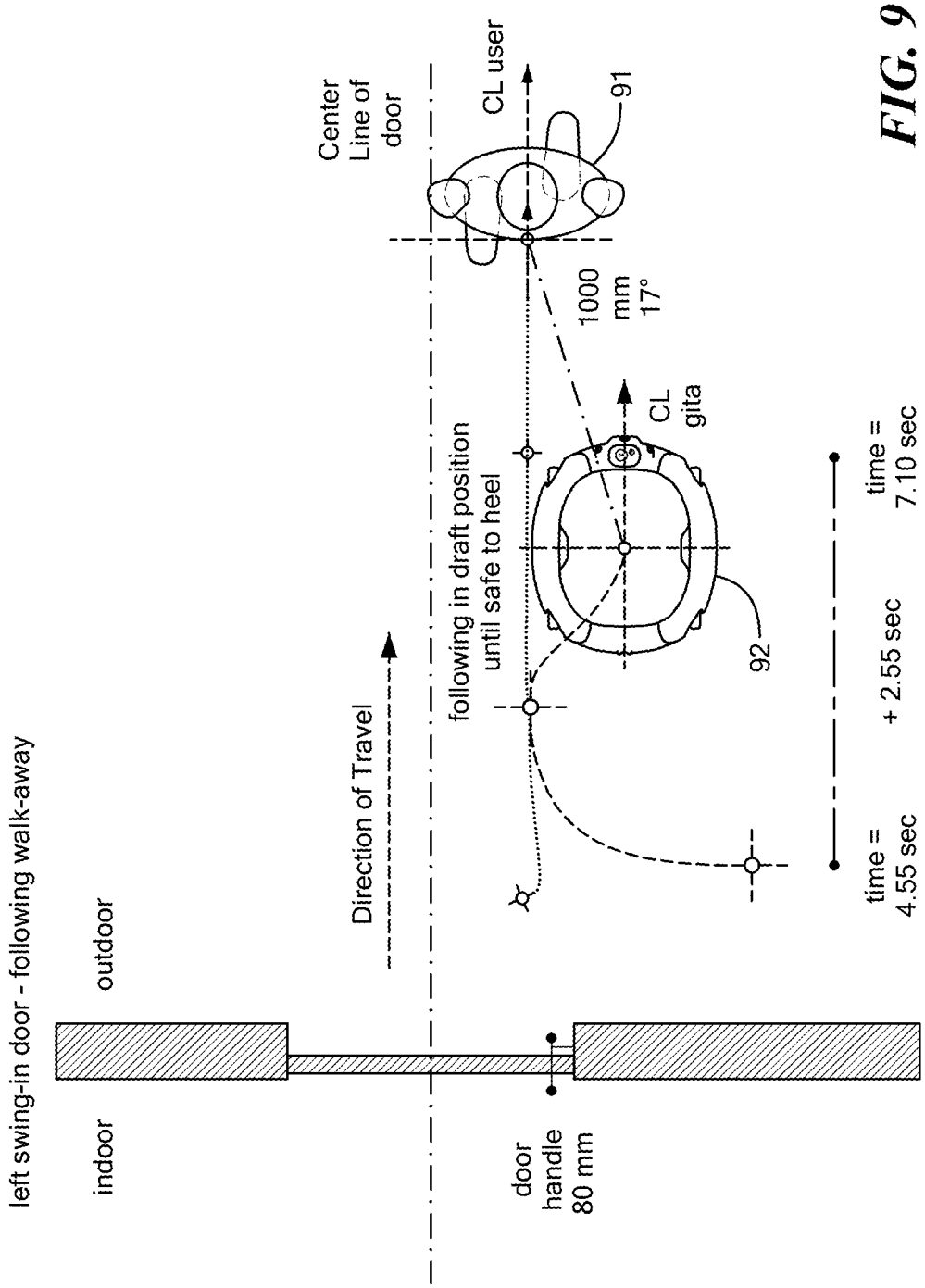
FIG. 9 is a diagram illustrating, from a top view, relative positions of a user and an etiquette-based vehicle, in the following walk-away moment (as defined in below), in accordance with an embodiment of the present invention, after the recoupling moment and vehicle has re-entered pair mode with the user.

Following walk-away moment. FIG. 9 is a diagram illustrating, from a top view, relative positions of a user 91 and an etiquette-based vehicle 92, in the following walk-away moment (as defined above), in accordance with an embodiment of the present invention, after the recoupling moment and vehicle 92 has re-entered pair mode with the user. When the user moves beyond the track zone with a velocity of at least 0.6 m/s, the vehicle is configured to operate in draft following position, centering itself directly behind the user, and then to transition to heel following position. The time duration from the recoupling moment to the following walk-away moment is 2.55 seconds. Following walk-away moment occurs at t=7.10 seconds in the door passage sequence.

RIGHT-SWING OUT. Relative to the direction of travel of the user, a Right-swing OUT door is mounted on the right side of a frame and swings outward away from the user. The total time for a pair passing through a Right-swing OUT door is 7.09 seconds. Passing through a Right-swing OUT door involves the same five door-passing moments as just described for a Left-swing IN door. Compared to the situation for a Left-swing IN door, the distances and timings are analogous, albeit not identical, since the geometries in each case are differing.

Figure 10:
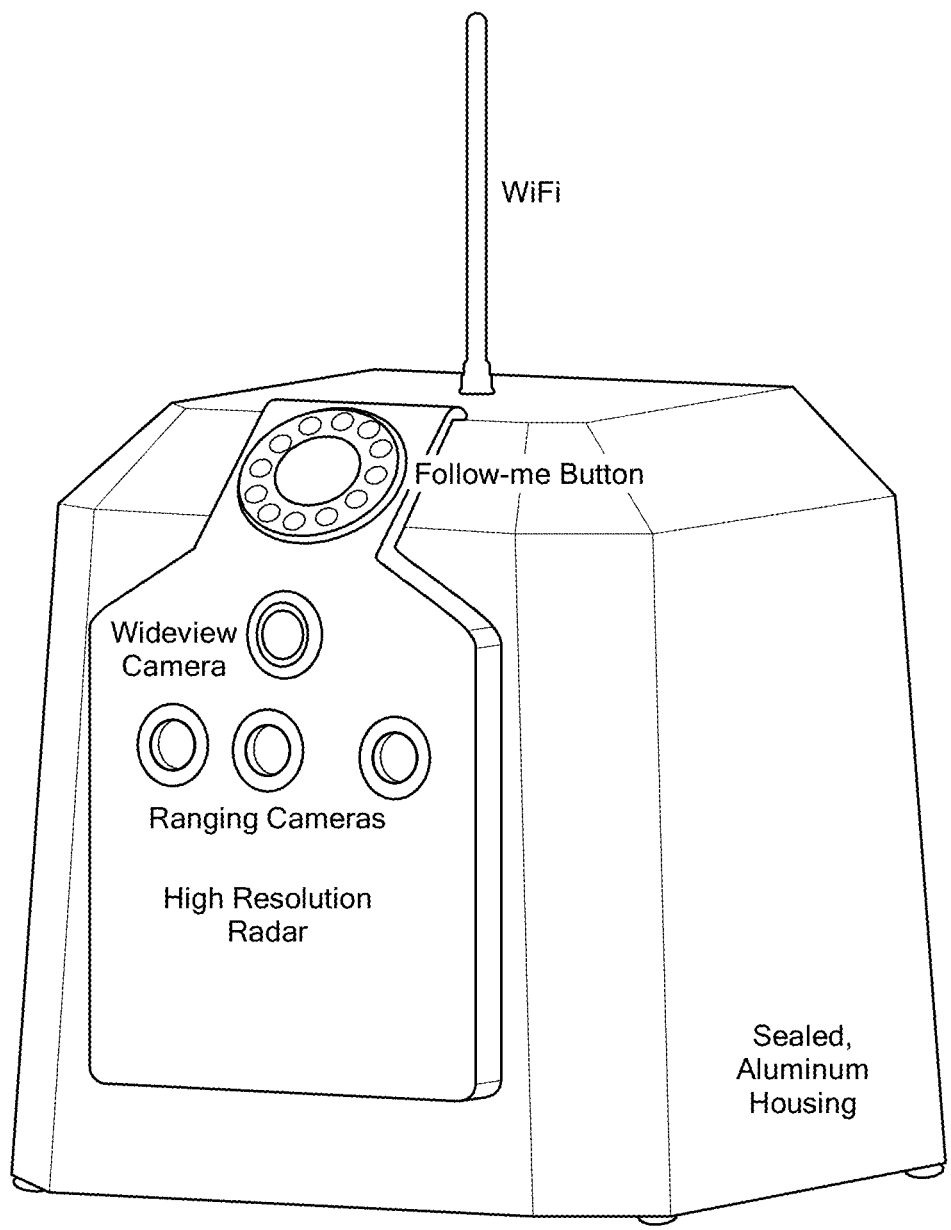
FIGS. 10 and 11 are front and rear views respectively of a smart-follow module fitted with a set of sensors and a controller configured to manage movement of an autonomous host self-powered vehicle, in accordance with another embodiment of the present invention.
Figure 11:
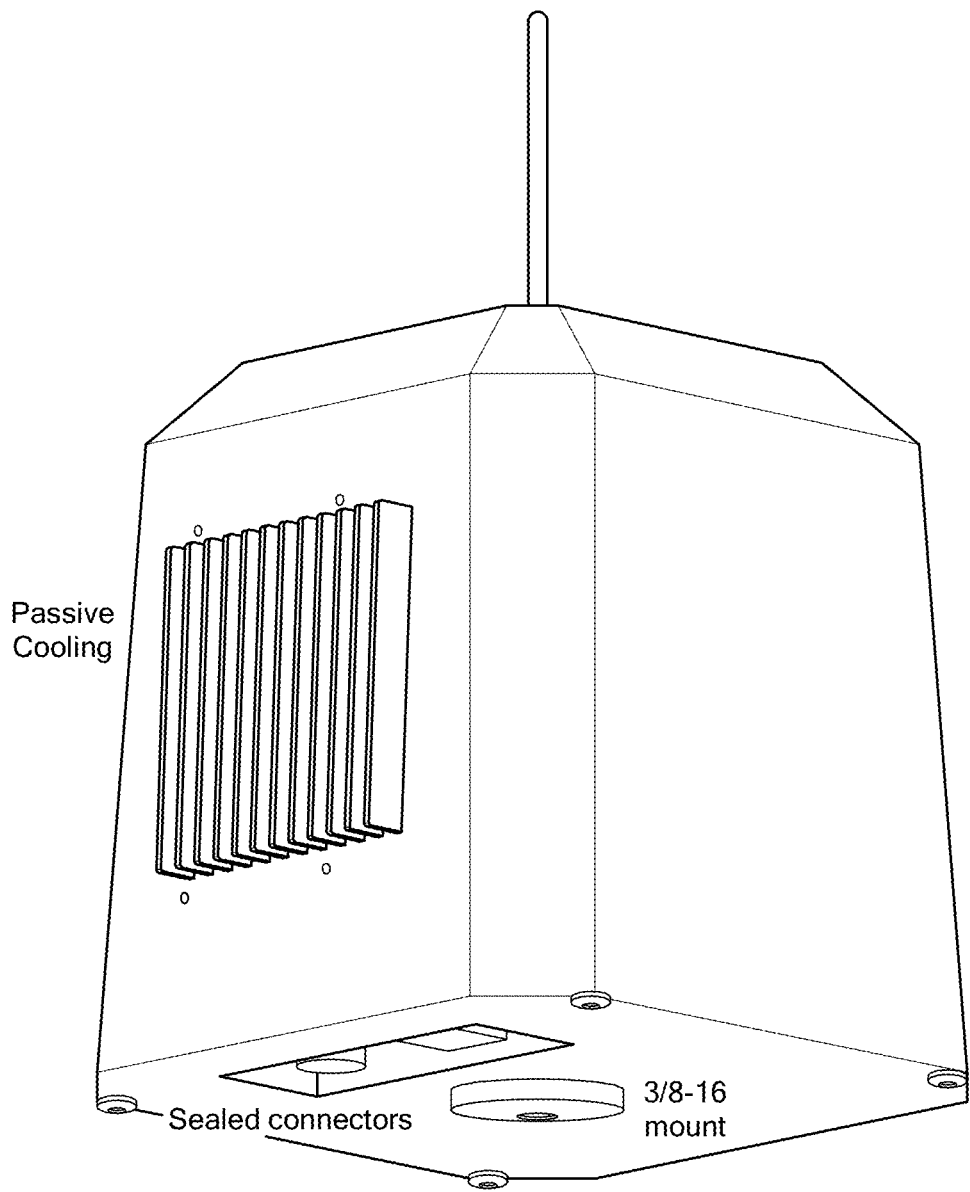

FIGS. 10 and 11 are front and rear views respectively of a smart-follow module fitted with a set of sensors and a controller configured to manage movement of an autonomous host self-powered vehicle, in accordance with another embodiment of the present invention.

Smart behavior mode and travelling along known paths. Non-commercial owners of etiquette-based vehicles, whether living in urban apartments, suburbs, or planned developments, are using the vehicles primarily outside of the home. After taking the vehicle out, the owners need to store the vehicle in a place, which is typically narrow, tucked away, or difficult to get the vehicle to access in a following mode. Similarly, commercial owners of etiquette-based vehicles have a need to store the vehicles in methods customized to their business venues, and may also have fleets of vehicles that need to be navigated. Teaching a vehicle to travel along a known path, allows the vehicle's owner to optimize accessibility of the vehicle in difficult-to-navigate spaces, rendering unnecessary the burden of otherwise leading the vehicle into such spaces.

A known path has been defined above as a trajectory over which a self-powered vehicle has been trained to navigate autonomously. An etiquette-based vehicle using a training behavior learns, from a user, a trajectory as a known path as shown in FIGS. 12-14.

Figure 12:
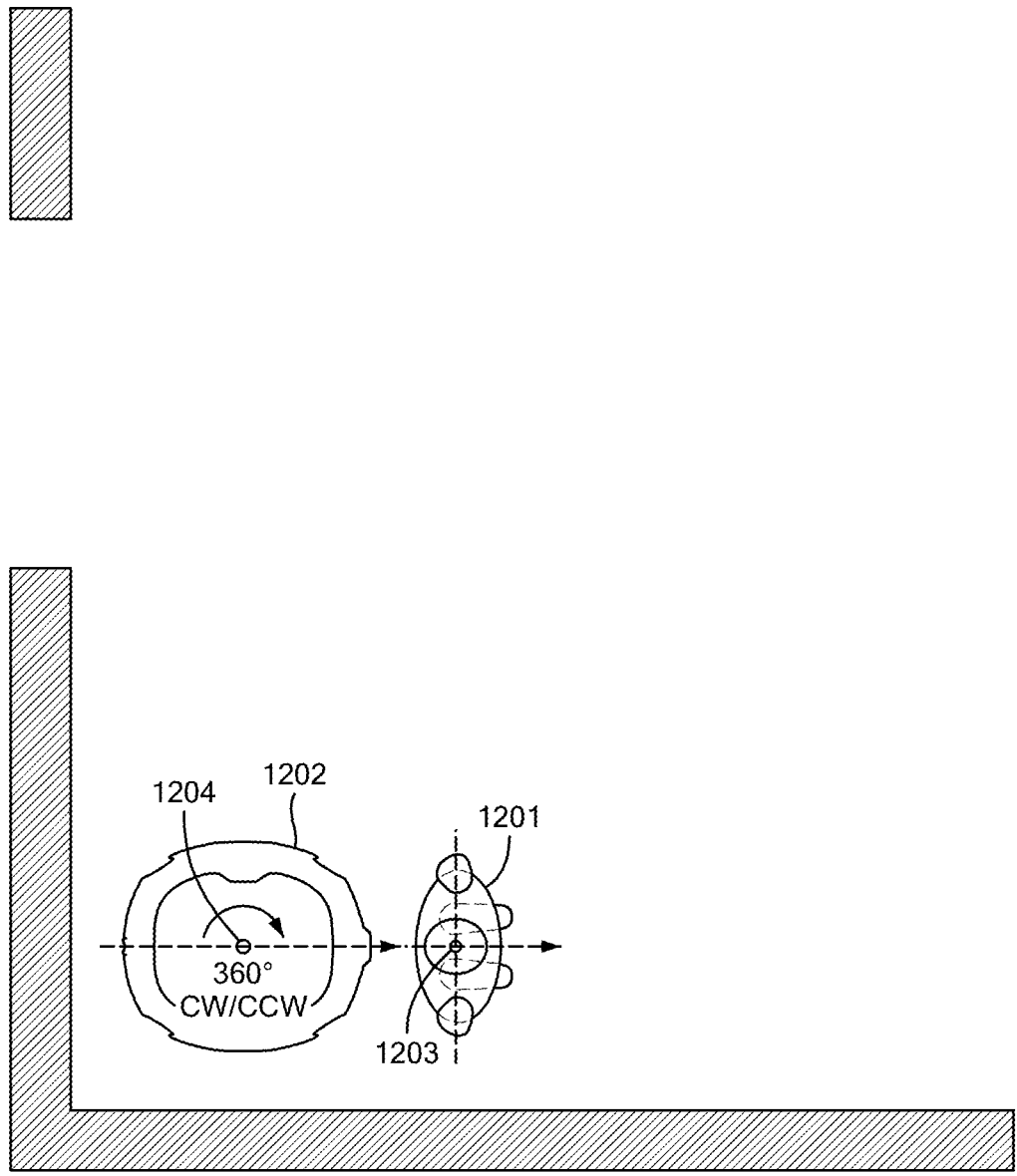
FIG. 12 is a diagram illustrating, from a top view, relative positions of a user and an etiquette-based vehicle, at the start of a training behavior (as defined below), in accordance with an embodiment of the present invention, before a user has shown the etiquette-based vehicle the known path.

FIG. 12 is a diagram illustrating, from a top view, relative positions of a user 1201 and an etiquette-based vehicle 1202, at the start of a training behavior (as defined above), in accordance with an embodiment of the present invention, before the user 1201 has shown the etiquette-based vehicle 1202 the known path. In some embodiments of the invention, when the user 1201 starts the training behavior, the vehicle 1202 will run a 360 degree scan of the environment around the vehicle's center 1204. In one embodiment of the invention, the vehicle 1202 creates a map of its surroundings from data collected in the 360 degree scan. After the scan, the vehicle 1202 will enter pair mode and with the user. As shown in FIG. 12, the vehicle has performed a scan and rotated to be behind the user 1201 and ready to follow such user. Since the user 1201 and the vehicle 1202 are larger than a point in space, in some embodiments, the vehicle will follow a trajectory of the user's center 1203 with the vehicles center 1204. In other embodiments, the vehicle 1202 follows the user's heel. In further embodiments of the invention, the vehicle may follow a wearable attachment.

In various embodiments of the invention the user can begin and end a training behavior of the vehicle through an app, a button on the vehicle, a somatic signal, a verbal signal, or other methods known to one having ordinary skill in the art.

Figure 13:
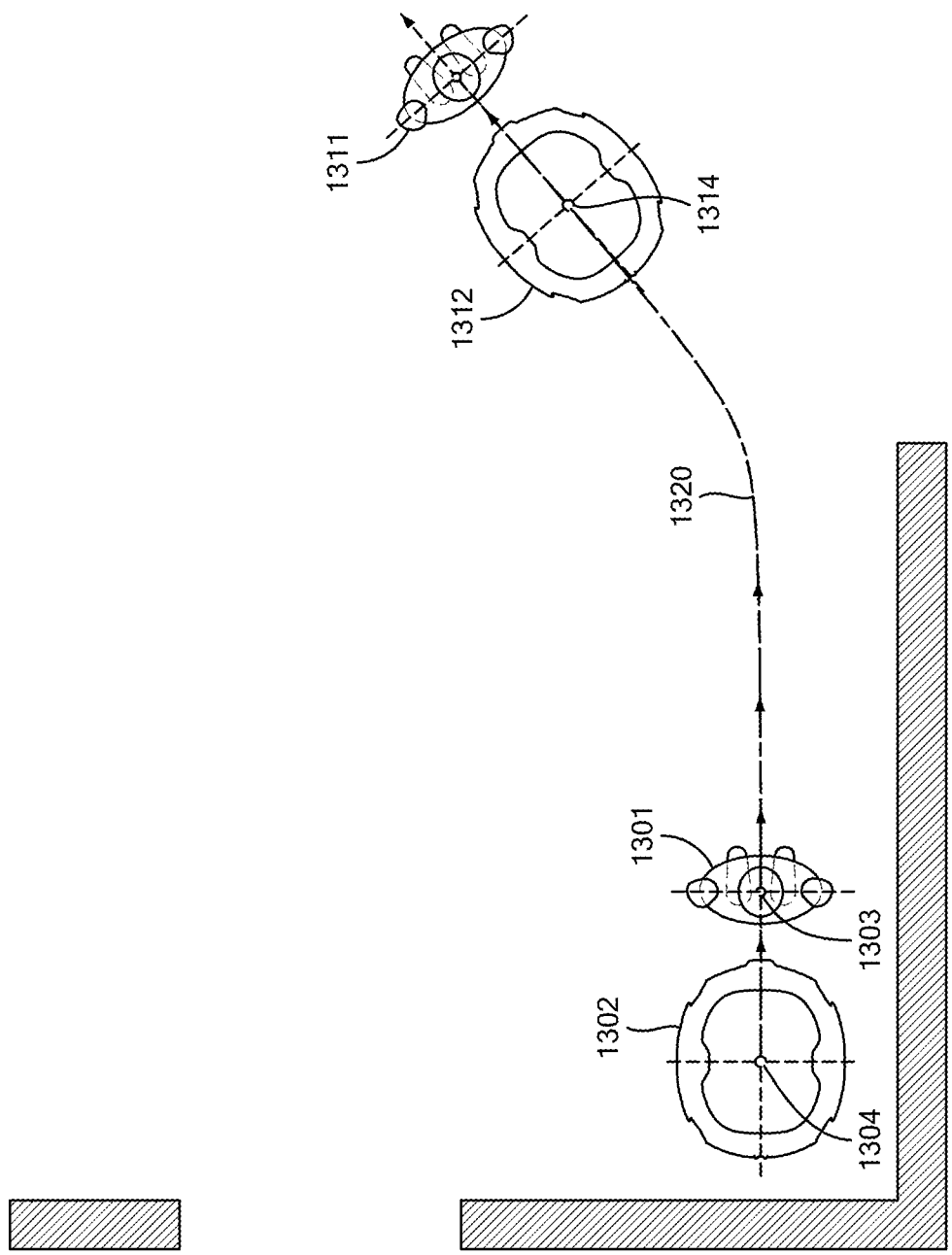
FIG. 13 is a diagram illustrating, from a top view, in accordance with an embodiment of the present invention, a known path from a start point to an end point of an etiquette-based vehicle and a user, in a training behavior (as defined below).
Figure 14:
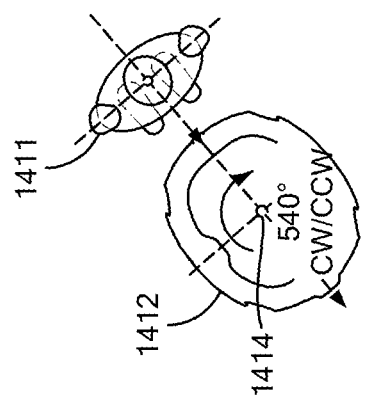
FIG. 14 is a diagram illustrating, from a top view, an etiquette-based vehicle and a user, at the end of a training behavior, in accordance with an embodiment of the present invention, wherein the vehicle has been instructed to follow the known path, (as defined below).

FIG. 13 is a diagram illustrating, from a top view, in accordance with an embodiment of the present invention, an etiquette-based vehicle moving along a trajectory 1320 from a start point 1304 to an end point 1314, following a user 1301, 1311. In FIG. 12, the user 1201 entered the training behavior, and the vehicle 1202 performed a scan. In FIG. 13, the user 1301 moves along the trajectory 1320, which is to be taught to the vehicle 1304. In various embodiments, the vehicles center 1304 follows different points 1303 of the user 1301. When the user 1311 has brought the vehicle 1312 to an endpoint of the trajectory 1320, the user 1311 may end the training behavior such that the vehicle will remember the end point 1314.

In some embodiments of the invention, the speed at which the user 1301 moves, and thus the corresponding speed at which the etiquette-based vehicle 1302 moves, will be the speed that the etiquette-based vehicle moves when it travels over the known path in the future. The trajectory follows the center of the user 1303 and the center of the vehicle 1304.

FIG. 14 is a diagram illustrating, from a top view, an etiquette-based vehicle and a user, at the end of a training behavior, in accordance with an embodiment of the present invention, wherein the vehicle 1412 followed the user 1411. In accordance with embodiments of the invention, when the user 1411 ends the training behavior, the vehicle marks its location 1414 as the end location of the path. In some embodiment of the invention, the vehicle remembers an area in which the training behavior was ended, and thus can recreate the known path from any point within that area. In some embodiments of the invention, when the training mode is complete, the user, or other operator, stores the known path with a name. In derivative embodiments, each direction of the path (i.e. start to end or end to start) may have its own name. This is advantageous as the user can select the path a plurality of known paths. The paths may be displayed on an app or other menu and having selections which direct the vehicle to move along the chosen path. In some embodiments of the invention, the vehicle remembers its orientation at the end of the path, and will recreate said orientation after travelling along the known path in the future. Similarly, in some embodiments, after completing the training behavior, the vehicle will rotate 540 degrees. 540 degrees allows for the vehicle to make a 360 degree scan and also orientate itself to return along the known path.

In some embodiments, to trigger the travel along the known path to start, the robot must be within a radius of the path start point, for example, one meter. In other embodiments, the travel along the known path is triggered by entering a specific mode. For example, in one embodiment, when the vehicle leaves park mode and is in a specific area, for example, its parking spot, the vehicle will automatically travel along a known path to be ready for function.

In some embodiments of the invention, the etiquette-based vehicle is able to adapt the known path to a smooth trajectory. In such embodiments the vehicle can interpolate a smooth trajectory from the path walked by the user to determine the known path. In further embodiments, the vehicle can use sensors to determine whether obstacles are in the known path. In such embodiments, the vehicle can stop and wait for the obstacles to clear, send an alarm, and find pathways around the obstacles.

Figure 15:
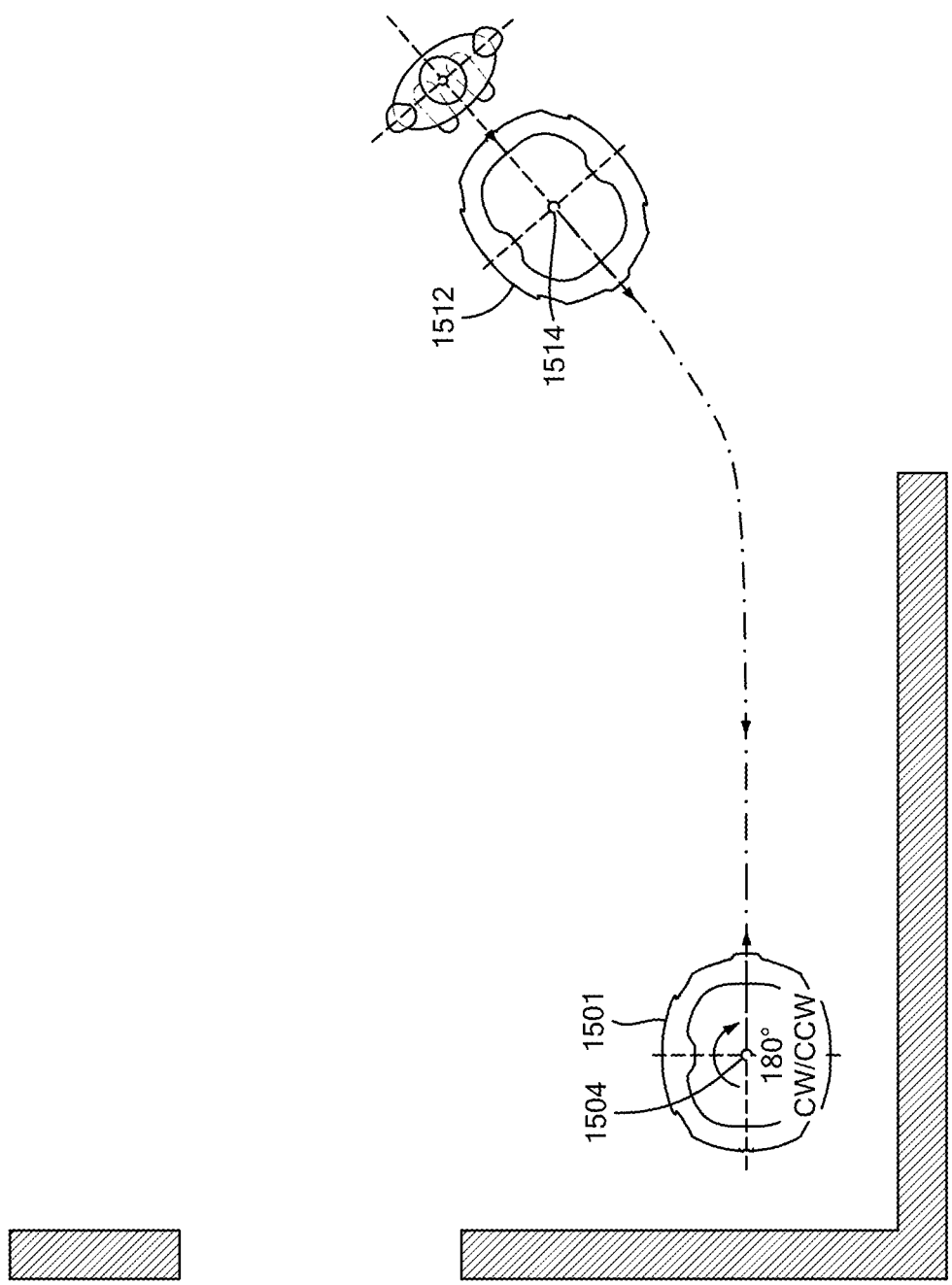
FIG. 15 is a diagram illustrating, from a top view, an etiquette-based vehicle exiting smart behavior mode and entering park mode after travelling along a known path, in accordance with an embodiment of the present invention.

FIG. 15 is a diagram illustrating, from a top view, an etiquette-based vehicle 1501 exiting smart behavior mode and entering park mode after travelling along a known path, in accordance with an embodiment of the present invention. In the embodiment shown in FIG. 15, the vehicle 1512 traverses the trajectory from the starting location 1514 to an ending location 1504. In some embodiments, the vehicle 1501 turns itself, about its axis, to face the direction it will move if reversing along said known path. In situations where the known path returns the vehicle to a storage spot, this is advantageous as the vehicle will more quickly be able to emerge from said storage spot when asked.

Figure 16:
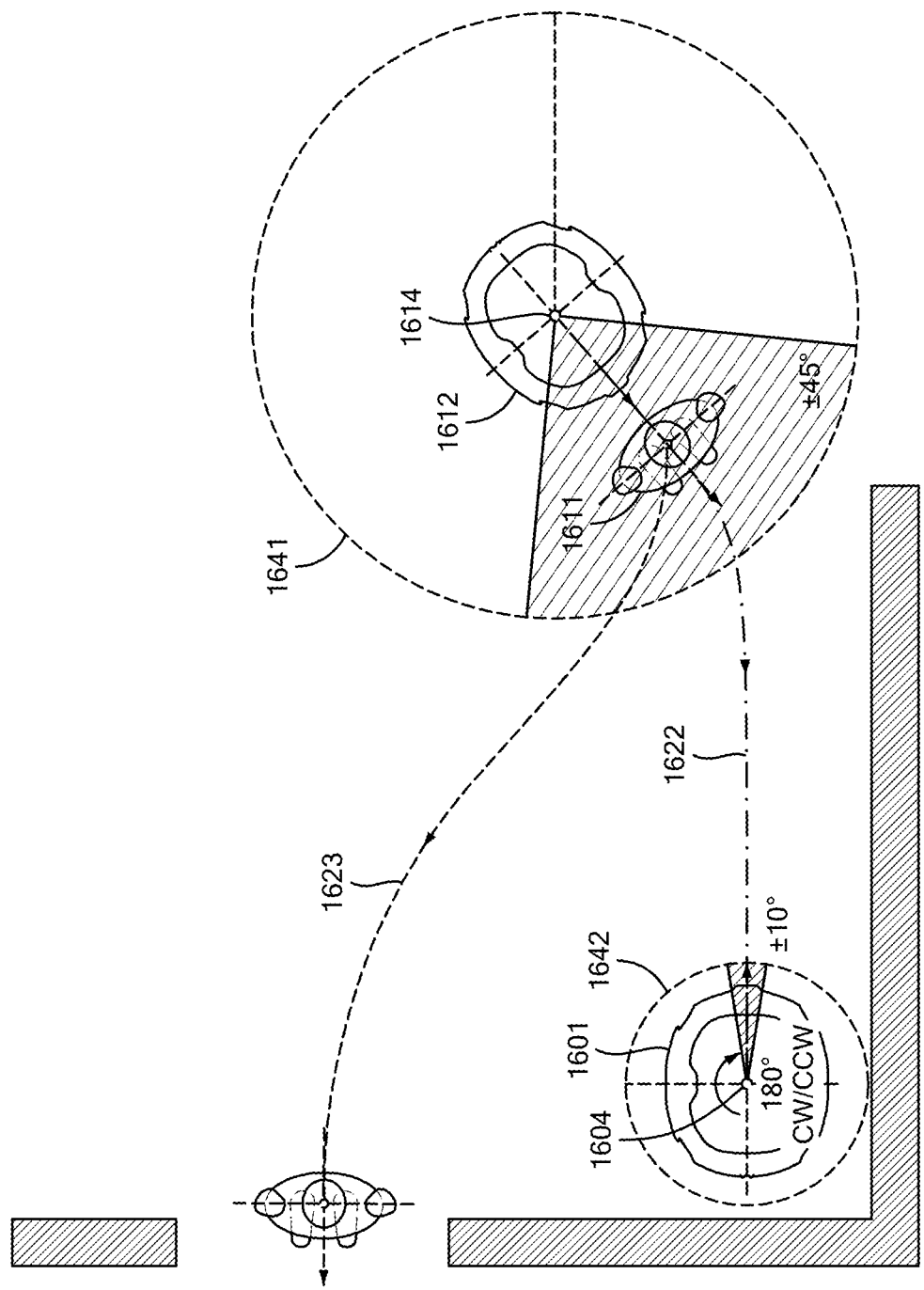
FIG. 16 is a diagram illustrating, from a top view, in accordance with an embodiment of the present invention, an etiquette-based vehicle in smart behavior mode following a known path (as defined below) and a user, which follows a different path.

FIG. 16 is a diagram illustrating, from a top view, in accordance with an embodiment of the present invention, an etiquette-based vehicle 1612 in smart behavior mode following a known path 1622 (as defined above). A user, which follows a different path 1623, is shown to portray the vehicle moves without regard to the user. Furthermore, the embodiment of FIG. 16 shows that the vehicle is still in smart-behavior mode as it is able to move autonomously, however, it is not in pair mode, as the vehicle does not follow the user. Additionally, FIG. 16 illustrates that the end location 1604 after travelling along a known path is, in some embodiments, a location 1642, here shown as a circle. Since the location 1642 is a larger than a point, the vehicle is better able to navigate obstacles or just ignore obstacles that are slightly obscuring the trajectory 1622 or location at the end of the known path. Similarly, the starting location 1614 is defined by a circle 1641. In this embodiment, the user 1611 may start the travel along the known path when the vehicle 1612 has entered anywhere in the radius 1641. This alleviates the need for precision which may be a hassle. When the vehicle 1601 has parked, in some embodiments, the vehicle performs a scan to determine the area around such vehicle.

Embodiments of Dynamic Behavior by Etiquette-Based Vehicles in a Convoy.

In the definitions above, we have said that, in a convoy each of a set of etiquette-based vehicles are in in pair mode with a distinct object selected from the group consisting of (i) a leader and (ii) another vehicle of the set. In a convoy, etiquette-based vehicles of the set are configured to move in succession behind the leader, with the first etiquette-based vehicle of the set located immediately behind the leader, and successive etiquette-based vehicles of the set being located thereafter.

Figure 19:
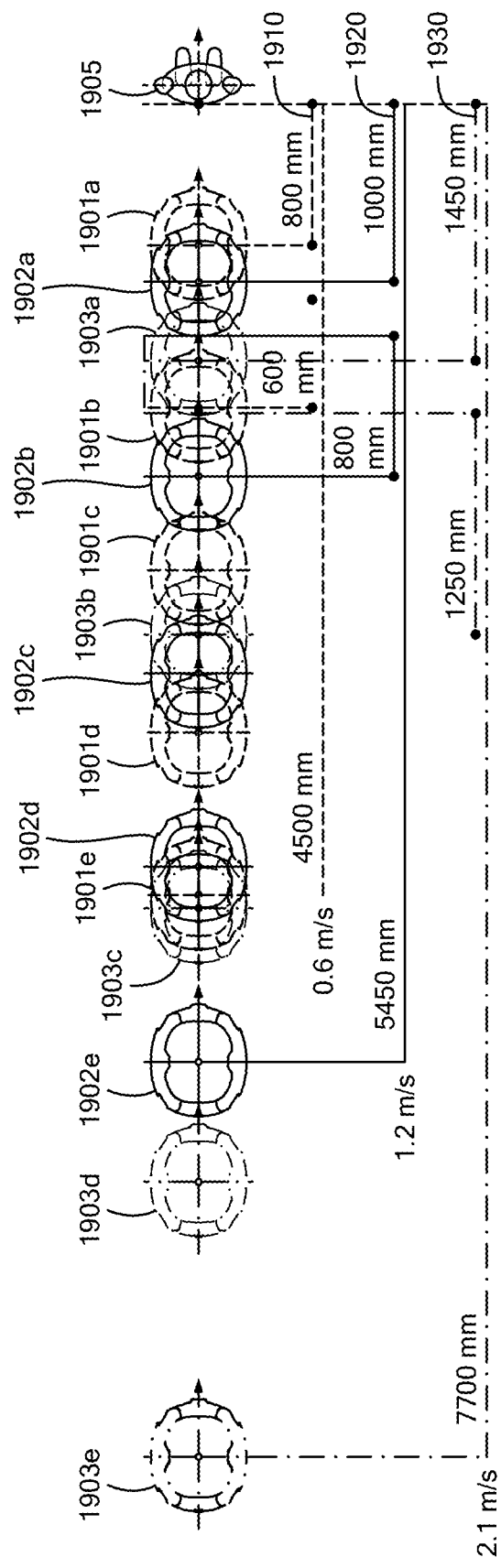
FIG. 19 is a diagram illustrating, from a top view, in accordance with an embodiment of the present invention, a plurality of etiquette-based vehicles in convoy behavior (as defined below) following a user with hysteresis dynamics.
Figure 20:
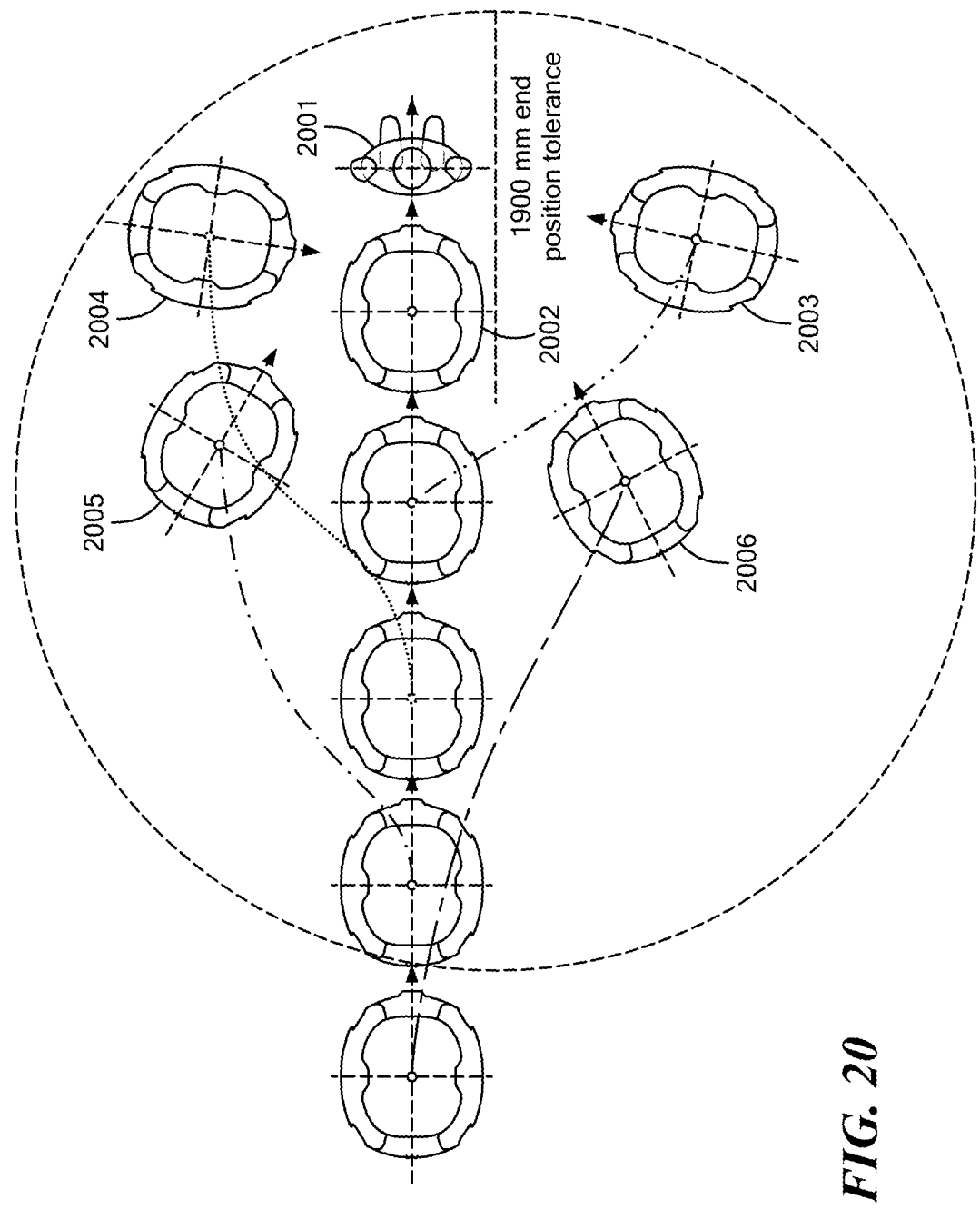
FIG. 20 is a diagram illustrating, from a top view, in accordance with an embodiment of the present invention, a plurality of etiquette-based vehicles as convoy behavior is toggled off and the etiquette-based vehicles navigate to a final position.

In some embodiments, the convoy behavior of the etiquette-based vehicles has three stages. The first stage, shown in FIG. 18, involves getting in line. The vehicles are originally spaced and will fall in line as the user 1801 executes traversal of a trajectory. The second stage, shown in FIG. 19, is following in line. The vehicles travel, with hysteresis dynamics, successively in line behind the user 1905. The third stage, shown in FIG. 20, is getting out of line, during which each of the vehicles exits pair mode and executes a smart behavior to return to a grouping different from a line formation.

Furthermore, in some embodiments of the invention, each vehicle in the convoy moves with hysteresis dynamics. As defined above, "hysteresis dynamics" refers to operation of an etiquette-based vehicle so as to exhibit latencies in following movements of the user in a manner consistent with ergonomic comfort of the user and pedestrian courtesy. Since the user and the paired vehicle are self-powered and constitute a dynamic combination of components, the vehicle's controller is programmed to cause the vehicle to move in a range of distinct dynamic contexts.

Figure 17:
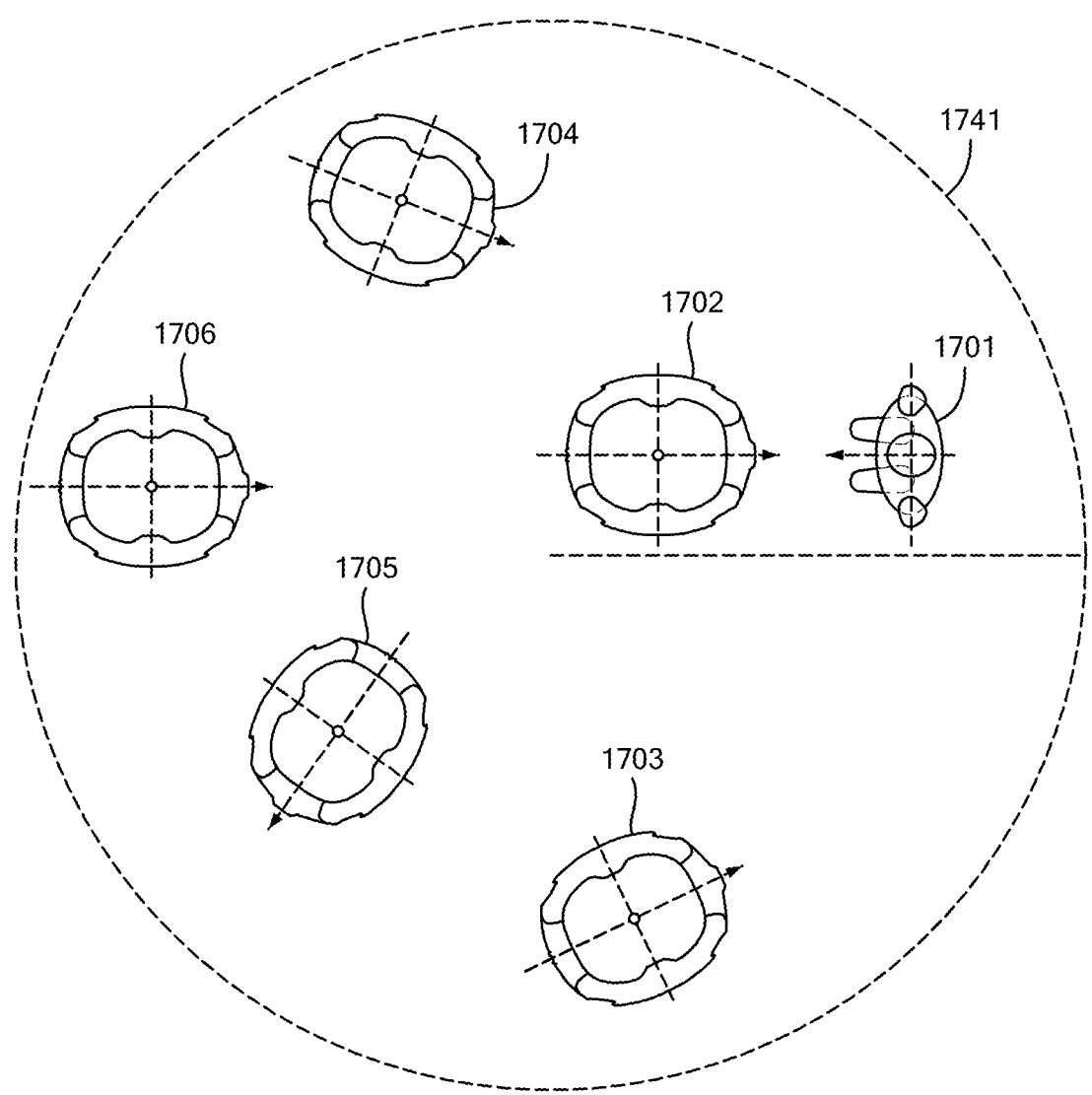
FIG. 17 is a diagram illustrating, a group of etiquette-based vehicles forming a convoy in accordance with an embodiment of the present invention.

FIG. 17 is a diagram illustrating a group of etiquette-based vehicles 1702, 1703, 1704, 1705, 1706 forming a convoy in accordance with an embodiment of the present invention. In some embodiments, the vehicles that form the convoy start within a specific radius 1741, which is, for example, 1.9 meters. In further embodiments, each robot that the user would like to place in the convoy must be within 1 meter of the nearest robot also selected for the convoy. In one embodiment of the invention, after initialization of the convoy behavior, each robot enters pair mode with the vehicle it will be following. In some embodiments, a user 1701 may select a vehicle 1702 with which to enter a convoy behavior, and such vehicle would pair with the user 1701, and thus be the first vehicle behind the user. The vehicle 1702 would then find the other vehicles within a proximity and communicate to those vehicles to enter convoy behavior as well. Then, a second vehicle 1704 pairs with the first vehicle, and a third vehicle 1706 pairs with the second vehicle. This process is continued until each vehicle has been paired. In some embodiments, the order of the vehicles in the convoy is determined by proximity to the user 1701. In other embodiments the order is randomly determined.

Figure 18:
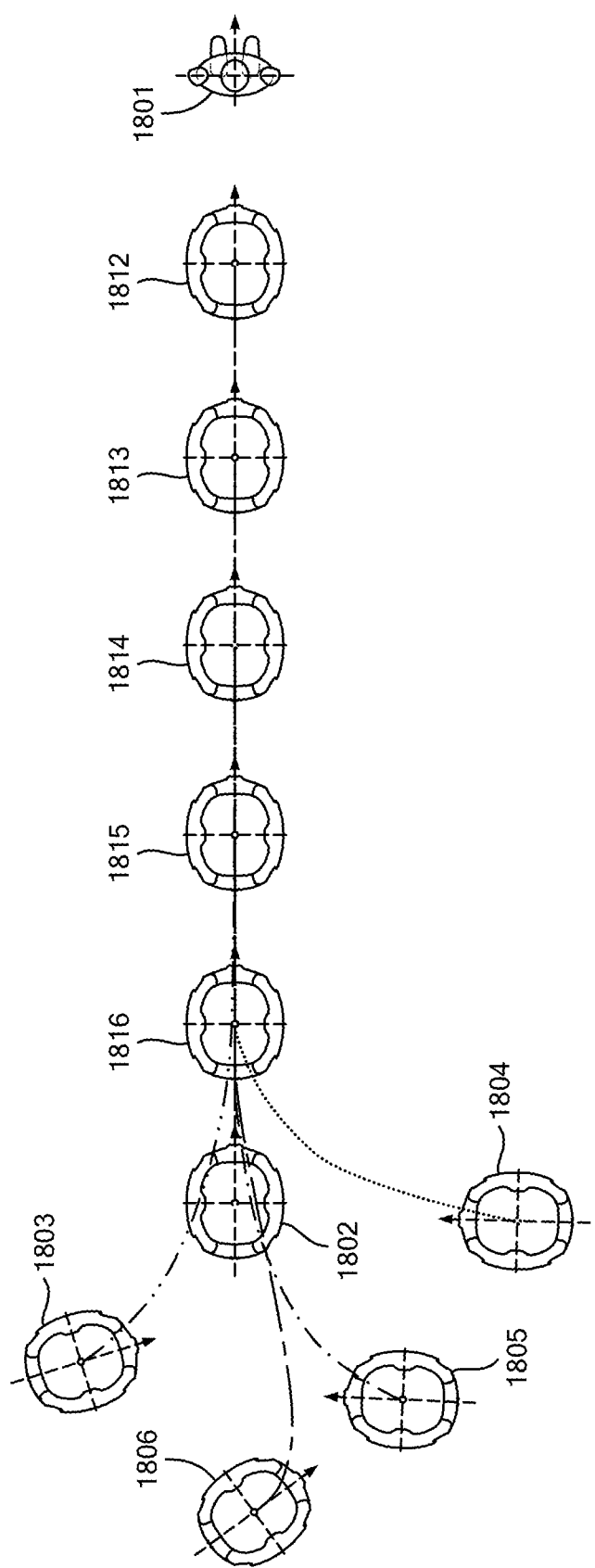
FIG. 18 is a diagram illustrating, from a top view, in accordance with an embodiment of the present invention, a plurality of etiquette-based vehicles in convoy behavior (as defined below) following a user.

FIG. 18 is a diagram illustrating, from a top view, in accordance with an embodiment of the present invention, a plurality of etiquette-based vehicles in the first stage of convoy behavior (as defined above) following a user 1801. In one embodiment of the invention, once the leader, in FIG. 18 user 1801, begins walking, a first vehicle will follow the leader, a successor vehicle will follow the first vehicle, and so on, so that the vehicles enter a line formation. In one embodiment, the first vehicle 1802 follows the user after 1.8 seconds. In this embodiment, each successive etiquette-based vehicle (which we sometimes call a "robot") 1803, 1804, 1805, and then 1806, will be in the final following position 1.3 seconds after the previous robot. That is, robot 1803 will enter the line formation 3.1 seconds after the leader began walking, robot 1804 will enter the line formation 4.4 seconds after the leader began walking, and so on until each vehicle has entered the line formation. In different embodiments, the time to enter the line formation depends on the user's walking speed and other factors. In the embodiment shown in FIG. 18, the order was chosen by proximity to the first following position. Once each vehicle had entered the convoy, vehicle 1802 is in place 1812, vehicle 1803 is in place 1813, vehicle 1804 is in place 1814, vehicle 1805 is in place 1815, and vehicle 1806 is in place 1816.

FIG. 19 is a diagram illustrating, from a top view, in accordance with an embodiment of the present invention, a plurality of etiquette-based vehicles in convoy behavior (as defined above) following a user with hysteresis dynamics. Hysteresis dynamics within the convoy aids in portraying the convoy as a plurality of individual vehicles working together instead of a robotic cluster of vehicles. This human feel provides a sense of comfort to the user and viewers alike. In some embodiments, following with hysteresis dynamics is achieved by the vehicles' following at different distances based on the speed of the object they are following. In one embodiment, the vehicle follows 600 mm behind an object moving 0.6 m/s; 800 mm behind an object moving at 1.2 m/s; and 1250 mm behind an object moving at 2.1 m/s. Such a vehicle stays 450 mm behind a stopped vehicle. Each distance is shown in FIG. 19 by the groups of vehicles 1901, 1902, and 1903. The first vehicle in each group represented by 1901a, 1902a, and 1903a is a set distance behind the user 1905 depending on the speed of the user. These following distances mimic typical human behavior when following another human. The following distance for group 1901 is shown in 1910, the following distance for group 1902 is shown in 1902, and the following distance for group 1903 is shown in 1930.

To overcome obstacles in the path, a vehicle's path in the convoy may deviate from the direct trajectory of the object it is following. In some embodiments, the vehicle may be allowed a certain amount of grace within which to leave the path of the object it is following, for example, 240 mm.

FIG. 20 is a diagram illustrating, from a top view, in accordance with an embodiment of the present invention, a plurality of etiquette-based vehicles as convoy behavior is toggled off and the etiquette-based vehicles get out of line. In various embodiments, convoy behavior is turned off through an app, a somatic signal, a verbal signal, or pressing a button on the vehicle. In some embodiments, when convoy behavior is terminated, the etiquette-based vehicles 2002, 2003, 2004, 2005, 2006 use a smart behavior to enter into a cluster near where convoy mode has been terminated. In these embodiments, when convoy behavior of a vehicle is terminated, the behavior includes a transitional aspect during which the vehicle engages in leaving the line formation to form, with other vehicles formerly in the convoy, a cluster. In one embodiment, once the vehicles are all in the cluster, the clustered vehicles enter park mode. As shown in FIG. 20, vehicle 2002 was not required to move to form the cluster. In similar embodiments, other vehicles, for example, including vehicle 2003, are not required to move to form a cluster. In one embodiment, if the vehicles are in park mode when convoy behavior is terminated (for example, because the user stopped moving and thereafter ended convoy behavior), they will briefly exit park mode and perform a smart behavior to move into a radius and then re-enter park mode. In other embodiments, when convoy behavior is terminated, the vehicles immediately enter park mode. In further embodiments, when convoy behavior is terminated, the vehicles will travel along a known path. In some embodiments, the vehicles organize themselves such that each vehicle is in a resting spot at a similar time. Therefore, the vehicles in the back of the line would be in the back of the cluster and vice versa.

Sensor System Embodiments for Use by an Etiquette-Based Vehicle in Pair Mode.

Because, in pair mode, an etiquette-based vehicle is configured to follow, with hysteresis dynamics, a trajectory of a user, it is essential for the etiquette-based vehicle to obtain information as to the user's position over time, and, also usefully, the user's orientation over time. For this purpose, the etiquette-based vehicle is provided with a set of sensors.

Optical imaging systems using electronic image sensors provide high resolution color and intensity information representing a 3-D scene projected onto the image plane.

The image representation is typically divided into picture elements (pixels) arranged as a rectangular array. Modern solid-state sensors can supply tens of megapixels resolutions. Typical consumer CMOS sensors range from 5-20 megapixels, and industrial grade sensors range from 1-10 megapixels. Many applications require an understanding of the range to each element in the scene, which represents the third dimension of the image, the "depth."

There are two commonly used technologies for achieving depth information using optical imaging, Time-of-Flight (TOF) imaging and stereoscopic ranging. In a system using TOF imaging, a bright infra-red light is flashed from a location proximate to the image sensor along the same viewing axis to the scene. Each pixel in the sensor measures the time from the activation of the flash until the reflected light is received at the pixel, so as to provide an estimate of the distance to the illuminated portion of the scene. There are numerous disadvantages to this type of system, including high power requirements, low resolution, and range.

In a stereoscopic ranging system, two identical cameras are arranged in a fixed and stable relationship. Two images are captured simultaneously, and the resulting images are compared pixel by pixel to provide a 2-D image representation along with a range estimate for each pixel determined by measuring the pixel disparity between the two cameras for features in the scenes. Stereoscopic cameras can use any image sensor, so the sensors selected for the application can be selected for a desired image quality. Because stereoscopic cameras do not require the flashing of a bright light, they consume less power than TOF cameras. Also, the range and precision can be optimized by selecting the resolution of the imager and the distance between them in the apparatus.

Monocular imaging systems cannot by themselves provide range data, but if the target is identifiable, they can provide bearing information. Optimizing the performance of a ranging imager generally requires its FOV to be limited to 90 degrees or less. In situations where the leader moves to the side of the FOV of the 3D ranging system, the angular bearing can still be determined in the wide FOV monocular camera to allow the vehicle to be rotated to the right heading to recapture the leader in the 3D sensor FOV.

In a first embodiment of a set of sensors for use with an etiquette-based vehicle in pair mode, we combine the use of a stereoscopic ranging optical imaging system with a wide FOV monocular imaging system. Both sensors supply information to a tracking system used by the vehicle to determine the location of the user being followed by the vehicle. The tracking system monitors the point information along with the image information to calculate the location of the user with respect to the vehicle. In the event that one sensor or the other is compromised by some external factor, such as sunlight, the other sensor can still provide adequate information to maintain operation until the disturbance is removed. In situations where the user moves to the side of the FOV of the 3D ranging system, the angular bearing can still be determined in the wide FOV monocular camera to allow the vehicle to be rotated to the right heading to recapture the leader in the 3D sensor FOV.

In a second embodiment of a set of sensors for use with an etiquette-based vehicle in pair mode, we combine 3D optical imaging with 3D radio imaging to provide user tracking information to the vehicle when in pair mode with the user. An optical imaging system employing machine vision techniques and a high-resolution multi-antenna radar imaging system to provide robust 3D point clouds under changing environmental conditions. The system includes a wide FOV monocular color camera, and a 4D (x,y,z,v) radar ranging sensor. The camera and radar systems are placed near each other on the vehicle and have overlapping fields-of-view (FOV).

Radar systems employ RF signal emissions and reflections to identify the range to a target. Multiple antenna systems can provide range to targets along with X,Y or elevation and azimuth information. Modern solid state radar systems can provide high resolution imaging providing x,y,z and velocity information for each voxel sensed. Radar systems, however, cannot operate at the same speed as optical systems, do not yet have the same high resolution, and do not provide any information about color in the scene.

In second embodiment, we combine the use of a stereoscopic ranging optical imaging system with a high-resolution radar system. Both sensors supply information to the tracking system. The tracking system monitors the point information along with the image information to calculate the location of the leader with respect to the vehicle. In the event that one sensor or the other is compromised by some external factor, such as sunlight, the other sensor can still provide adequate information to maintain operation until the disturbance is removed.

In a third embodiment of a set of sensors for use with an etiquette-based vehicle in pair mode, we combine a wide FOV monocular optical imaging system with a high-resolution radar system. Both sensors supply information to the tracking system. The tracking system monitors the point information along with the image information to calculate the location of the user with respect to the vehicle. In the event that one sensor or the other is compromised by some external factor, such as sunlight, the other sensor can still provide adequate information to maintain operation until the disturbance is removed. In situations where the user moves to the side of the FOV of the 3D ranging system, the angular bearing can still be determined in the wide FOV monocular camera to allow the vehicle to be rotated to the right heading to recapture the leader in the 3D sensor FOV.

In a fourth embodiment of a set of sensors for use with an etiquette-based vehicle in pair mode, we combine 3D optical imaging with 3D radio imaging and wide FOV monocular imaging to provide leader tracking information for a following vehicle. Specifically, the set of sensors includes an optical imaging system employing stereoscopic ranging techniques and a high-resolution multi-antenna radar imaging system to provide robust 3D point clouds under changing environmental conditions. The set of sensors further includes a stereoscopic ranging camera system and a 4D (x,y,z,v) radar ranging sensor. The stereo and radar systems are placed near each other on the vehicle and have similar and overlapping fields-of-view (FOV). An additional wide FOV monocular imaging camera is included to provide bearing information when the leader steps outside the FOV of the 3D sensors.

In the event that one sensor or the other is compromised by some external factor, such as sunlight, another sensor can still provide adequate information to maintain operation until the disturbance is removed. In situations where the user moves to the side of the FOV of the 3D ranging systems, the angular bearing can still be determined in the wide FOV monocular camera to allow the vehicle to be rotated to the right heading to recapture the user in the 3D sensor FOV.

FIGS. 10 and 11 are front and rear views respectively of a smart-follow module fitted with a set of sensors and a controller configured to manage movement of an autonomous host self-powered vehicle, in accordance with another embodiment of the present invention. When the smart-follow module is implemented in the host vehicle, the host vehicle then operates as an etiquette-based vehicle, in the manner described in connection with the previous figures, and thus is configured for operation in collaboration with a user as previously described.

Using video and radar sensing, the module can identify a target user and provide range and heading information to the host vehicle for tracking and following the user. As described with respect to other embodiments, the module provides for intelligent trajectory planning and behavior control in an intuitive context that is comfortable for pedestrians. The module is equipped with an ethernet connection for integrating with the host vehicle system. An API allows for setting of module or vehicle specific parameters, modes of operation, data rates, and data formats. The API also allows for operational control of the system, setting up WiFi access, and updating system software. All measurement and log data are communicated over this port when operating, as real time data. Video and sensor image streaming is available (at reduced rates) over the separate WiFi connection. In use, of the module, the vehicle host provides the module with the necessary operational settings, such as: height above the ground plane, inclination angle, maximum target range, target type (person, machine), data rate (10-30 Hz), and data format (range, heading angle units). In various embodiments, the user selects the operating mode: pure follow, heeling, custom offsets. After the system is started, the user presses the "pair" button the vehicle and user are in position. The module then begins processing the user's heading information and makes the information available to the host using the specified protocol. The host then operates the vehicle based on the information coming from the module. If the module loses pairing, a lost message is sent to the host. When the task is complete, the operator can push the pair button to unpair, or the host can send a stop command to the module.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A self-powered personal vehicle comprising:
a mechanical drive system to cause movement of the vehicle;
a set of sensors configured to collect data indicative of presence of an object proximate to the vehicle; and
a controller, coupled to the mechanical drive system and to the set of sensors, to manage movement of the vehicle based at least in part on the data,
wherein the controller is configured to cause the vehicle to operate: (i) in a pair mode with a user wherein the vehicle follows, with hysteresis dynamics, a trajectory of the user, and (ii) in a smart behavior mode, in which the vehicle has autonomously exited from the pair mode and autonomously executes an autonomous behavior; and
wherein in the pair mode, when the user occupies a position in a dead zone, defined relative to the vehicle, the controller is configured to deem the user stationary for purposes of following the user's trajectory, and when the user is outside of the dead zone but occupies a position in a track zone that surrounds the dead zone, the controller is configured to pivot the orientation of the vehicle so that the user remains in a field of view of the set of sensors.

2. A self-powered personal vehicle according to claim 1, wherein the controller is configured to cause the vehicle to operate in the pair mode so that the vehicle occupies a speed-dependent position behind the user.

3. A self-powered personal vehicle according to claim 2, wherein the controller is configured to cause the vehicle to operate in the pair mode so that, in the absence of an obstacle in the way of the vehicle, the speed-dependent position is also on a default side of the user.

4. A self-powered personal vehicle according to claim 1, wherein the dead zone is teardrop shaped.

5. A self-powered personal vehicle according to claim 4 wherein the track zone is triangular sector of a parabola.

6. A self-powered personal vehicle according to claim 1, wherein the controller is configured to cause the vehicle to operate in the pair mode so that, when the user leaves the track zone with a velocity in excess of a threshold, the vehicle begins following the user.

7. A self-powered personal vehicle according to claim 6, wherein the threshold is predetermined and is 0.6 m/s.

8. A self-powered personal vehicle according to claim 1, wherein when passing through a doorway, the controller is configured to cause the vehicle to perform a sequence of discrete actions including:
a. a following approach moment wherein the vehicle in the pair mode follows the user up until the moment when the user reaches a vicinity of the doorway;
b. a decoupling moment wherein the vehicle decouples from the pair mode with the user and initiates the passing through the doorway when a perceived door openness angle reaches a threshold angle;
c. a smarts moment wherein the vehicle engages in passing through the doorway and navigates through the doorway to a recoupling position;
d. a recoupling moment wherein the vehicle re-enters the pair mode with the user; and
e. a following walk-away moment wherein the vehicle transitions from a waiting position at the recoupling moment to a following position in the pair mode.

9. A self-powered personal vehicle comprising:
a mechanical drive system to cause movement of the vehicle;
a set of sensors configured to collect data indicative of presence of an object proximate to the vehicle; and
a controller, coupled to the mechanical drive system and to the set of sensors, to manage movement of the vehicle based at least in part on the data;
wherein:
(a) the controller is configured to cause the vehicle to operate (i) in a pair mode with a user wherein the vehicle follows, with hysteresis dynamics, a trajectory of the user, and (ii) in a smart behavior mode, in which the vehicle has autonomously exited from the pair mode and executes an autonomous behavior;
(b) the controller is configured to cause the vehicle to operate in the pair mode so that, in the presence of an obstacle in the way of the vehicle, the vehicle performs a tuck in the direction of a position immediately behind the user; and
(c) the tuck performed by the vehicle follows a cubic spline curve based on parameters including distance between the vehicle and the user, angle between the vehicle and the user, velocity of the user, velocity of the obstacle, and distance from the vehicle to the obstacle.

10. A self-powered personal vehicle comprising:
a mechanical drive system to cause movement of the vehicle;

a set of sensors configured to collect data indicative of presence of an object proximate to the vehicle; and a controller, coupled to the mechanical drive system and to the set of sensors, to manage movement of the vehicle based at least in part on the data;

wherein:

(a) the controller is configured to cause the vehicle to operate (i) in a pair mode with a user wherein the vehicle follows, with hysteresis dynamics, a trajectory of the user, and (ii) in a smart behavior mode, in which the vehicle has autonomously exited from the pair mode and executes an autonomous behavior;

(b) when the vehicle has been caused to operate in the pair mode and the user occupies a position in a dead zone defined relative to the vehicle, then, for purposes of following the user's trajectory, the controller is configured to deem the user to be stationary; and (c) when the vehicle has been caused to operate in the pair mode and the user occupies a position outside of the dead zone but in a track zone that surrounds the dead zone, the controller is configured to pivot the orientation of the vehicle so that the user remains in a field of view of the set of sensors.

11. A self-powered personal vehicle according to claim 10, wherein the dead zone is teardrop shaped.

12. A self-powered personal vehicle according to claim 11 wherein the track zone is triangular sector of a parabola.

13. A self-powered personal vehicle according to claim 10, wherein if the vehicle has been caused to operate in the pair mode, when the user leaves the track zone with a velocity in excess of a threshold, the vehicle begins following the user.

14. A self-powered personal vehicle according to claim 13, wherein the threshold is predetermined and is 0.6 m/s.

* * * * *